United States Patent
Tsuzuki et al.

(10) Patent No.: US 7,825,743 B2
(45) Date of Patent: *Nov. 2, 2010

(54) SYSTEMS AND METHODS FOR TUNING FILTERS

(75) Inventors: Genichi Tsuzuki, Ventura, CA (US); Matthew P. Hernandez, Santa Barbara, CA (US); Balam A. Willemsen, Newbury Park, CA (US)

(73) Assignee: Superconductor Technologies, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/330,510

(22) Filed: Dec. 8, 2008

(65) Prior Publication Data

US 2009/0121802 A1    May 14, 2009

(51) Int. Cl.
    *H03J 7/00*    (2006.01)
(52) U.S. Cl. .................................. 333/17.1; 333/99 S
(58) Field of Classification Search .............. 333/205, 333/17.1, 99 S
See application file for complete search history.

(56) References Cited

U.S. PATENT DOCUMENTS

| | | | |
|---|---|---|---|
| 5,055,651 A | 10/1991 | Schneider et al. | 219/121.68 |
| 5,616,539 A | 4/1997 | Hey-Shipton et al. | 505/210 |
| 5,808,527 A | 9/1998 | De Los Santos | 333/205 |
| 5,968,876 A | 10/1999 | Sochor | 505/210 |
| 6,259,208 B1 | 7/2001 | Crouch | 315/39.55 |
| 6,321,444 B1 | 11/2001 | Yatsuda et al. | 29/832 |
| 6,347,237 B1 | 2/2002 | Eden et al. | 505/210 |
| 6,356,163 B1 | 3/2002 | Dunsmore et al. | 333/17.1 |
| 6,380,819 B1 | 4/2002 | Dunsmore et al. | 333/17.1 |
| 6,529,750 B1 | 3/2003 | Zhang et al. | 505/210 |

(Continued)

FOREIGN PATENT DOCUMENTS

WO      WO 0249213 A1 *   6/2002

(Continued)

OTHER PUBLICATIONS

Herbert L. Thal, Jr., Computer-Aided Filter Alignment and Diagnosis, IEEE Transactions on Microwave Theory and Techniques, vol. MTT-26, No. 12, Dec. 1978.

(Continued)

*Primary Examiner*—Robert Pascal
*Assistant Examiner*—Alan Wong
(74) *Attorney, Agent, or Firm*—Wolff Law Offices PLLC; Kevin A. Wolff

(57) ABSTRACT

Methods, systems and apparatus for filter design, analysis and adjustment are provided. Various embodiments may include, for example, methods, systems and apparatus for electric signal filter tuning. Embodiments may also include design techniques for planar electric signal (e.g., RF signals) filter tuning. In at least an embodiment of the present invention a technique for filter tuning is provided which may include parameter extraction, optimization and tuning recipes techniques that may require only a single permanent filter tuning. In at least another embodiment a system and method of filter design, analysis and adjustment according to the present invention includes use of tuning that may be set using a mechanical scribing tool or a laser trimming device. In at least one other embodiment, a filter tuning technique may be provided and include providing trimming tabs on a resonator edge that may be disconnected or trimmed for filter tuning.

18 Claims, 22 Drawing Sheets

U.S. PATENT DOCUMENTS

| | | | |
|---|---|---|---|
| 6,662,029 B2 | 12/2003 | Eden et al. | 505/210 |
| 6,750,733 B1 | 6/2004 | Dunsmore et al. | 333/17.1 |
| 6,791,430 B2 | 9/2004 | Borzenets et al. | 333/17.1 |
| 6,987,427 B2 * | 1/2006 | Mattsson et al. | 333/17.1 |
| 7,117,025 B2 * | 10/2006 | Shih et al. | 505/210 |
| 7,482,890 B2 * | 1/2009 | Tsuzuki et al. | 333/17.1 |
| 2002/0068682 A1 | 6/2002 | Shen | 505/210 |
| 2003/0016099 A1 * | 1/2003 | Manseau et al. | 333/205 |
| 2003/0048148 A1 | 3/2003 | Humphreys et al. | 333/99 |
| 2003/0222732 A1 | 12/2003 | Matthael | 333/99 |

FOREIGN PATENT DOCUMENTS

WO    WO2005/053086 A    6/2005

OTHER PUBLICATIONS

Peter Harscher, Rudiger Vahldieck, and Smain Amari, Automated Filter Tuning Using Generalized Low-Pass Prototype Networks and Gradient-Based Parameter Extraction, IEEE Transactions on Microwave Theory and Techniques, vol. 49, No. 12, Dec. 2001.

Genichi Tsuzuki, Masanobu Suzuki, and Nobuyoshi Sakakibara, Superconducting Filter for IMT-2000 Band, IEEE Transactions on Microwave Theory and Techniques, vol. 48, No. 12, Dec. 2000.

N. J. Parker, S.W. Goodyear, D.J.P. Ellis, and R.G. Humphreys, Tuning Superconducting Microwave Filters by Laser Trimming, IEEE MTT-S Digest, 2002, pp. 1971-1974.

Gregory L. Hey-Shipton, Efficient Computer Design of Compact Planar Band-Pass Filters Using Electrically Short Multiple Coupled Lines, IEEE, 1999.

Notification Concerning Transmittal of International Preliminary Report on Patent Ability, Jun. 14, 2007, International Application No. PCT/US2005/042867.

Smain Amari, Synthesis of Cross-Coupled Resonator Filters Using an Analytical Gradient-Based Optimization Technique, IEEE Transactions of Microwave Theory and Technique, vol. 48, No. 9, Sep. 2000.

G. Pepe, F.-J. Gortz, H. Chaloupka, Computer-Aided Tuning and Diagnosis of Microwave Filters Using Sequential Parameter Extraction, IEEE MTT-S Digest, 2004.

* cited by examiner

FIG. 11

$R_1 = 1.059, R_{10} = 1.063$ $$M = \begin{bmatrix} 0.305 & 0.859 & 0.007 & -0.159 & 0 & 0 & 0 & 0 & 0 & 0 \\ 0.859 & 0.144 & 0.686 & 0.007 & 0 & 0 & 0 & 0 & 0 & 0 \\ 0.007 & 0.686 & 0.127 & 0.521 & 0.011 & 0 & 0 & 0 & 0 & 0 \\ -0.159 & 0.007 & 0.521 & 0.119 & 0.491 & -0.009 & -0.178 & 0 & 0 & 0 \\ 0 & 0 & 0.011 & 0.491 & 0.138 & 0.686 & 0.010 & 0 & 0 & 0 \\ 0 & 0 & 0 & -0.009 & 0.686 & 0.085 & 0.487 & -0.006 & 0 & 0 \\ 0 & 0 & 0 & -0.178 & 0.010 & 0.487 & 0.112 & 0.475 & -0.003 & -0.262 \\ 0 & 0 & 0 & 0 & 0 & -0.006 & 0.475 & 0.126 & 0.744 & 0.012 \\ 0 & 0 & 0 & 0 & 0 & 0 & -0.003 & 0.744 & 0.076 & 0.787 \\ 0 & 0 & 0 & 0 & 0 & 0 & -0.262 & 0.012 & 0.787 & 0.135 \end{bmatrix}$$

| R1 | R2 | R3 | R4 | R5 | R6 | R7 | R8 | R9 | R10 |
|---|---|---|---|---|---|---|---|---|---|
| 2232 | 1184 | 1024 | 1017 | 948 | 730 | 742 | 801 | 673 | 913 |

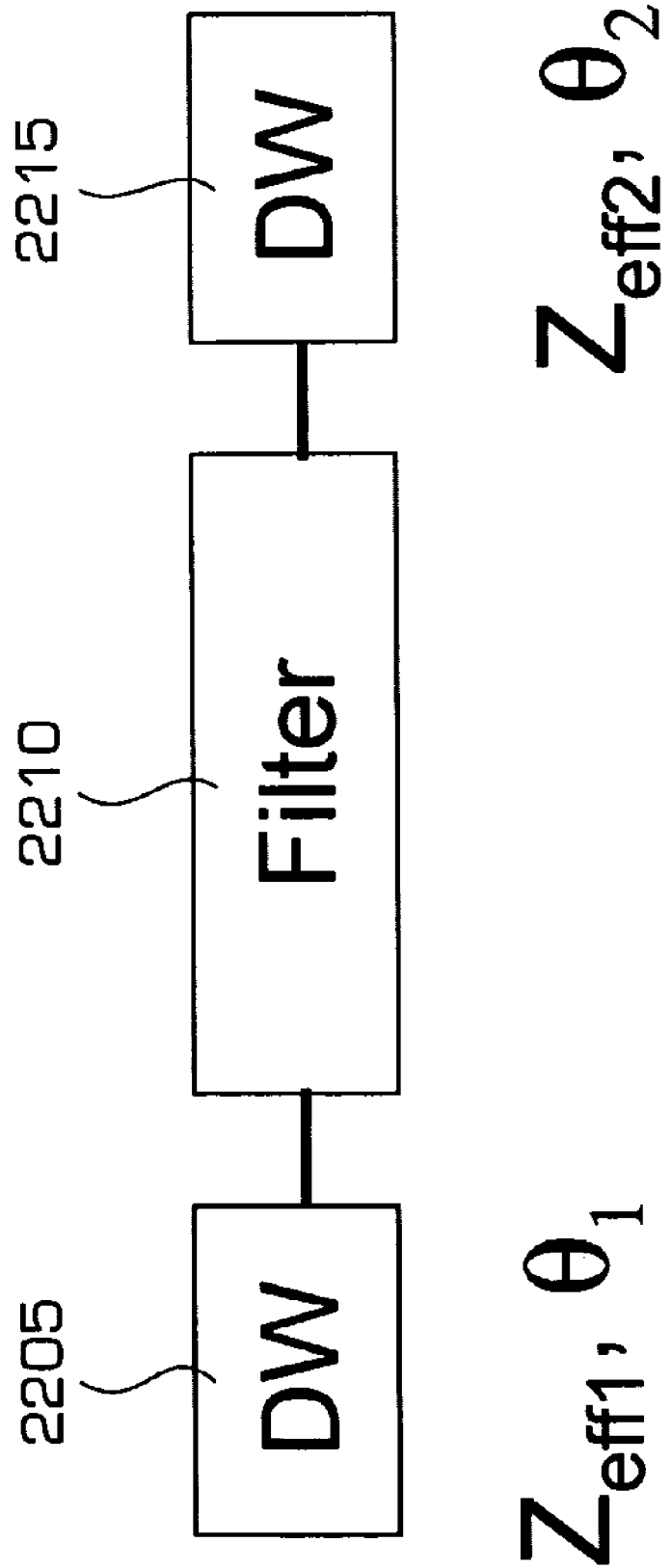

SYSTEMS AND METHODS FOR TUNING FILTERS

STATEMENT OF GOVERNMENT INTEREST

The invention provided herein was, at least in part, supported by the Totally Agile RF Sensor Systems, issued by DARPA/CMD under Contract No. MDA972-00-C-0010. The U.S. Government has a paid-up license in this invention and the right in limited circumstances to require the patent owner to license it to others on reasonable terms as provided for by the terms of Contract No. MDA972-00-C-0010 awarded by Defense Advanced Research Projects Agency, Defense Sciences Office, Order No. J607 (DARPA/CMD).

This application claims the benefit of U.S. Provisional Application No. 60/632,084, filed Nov. 30, 2004, the entire disclosure of which is hereby incorporated by reference as if set forth fully herein.

BACKGROUND

1. Field of the Invention

The present invention relates to the field of filter analysis and design and, more specifically, to systems and methods relating to tuning filters.

2. Description of Related Art

The past few decades have seen considerable advancement in electronics and wireless communications. The continued development and advancement of more highly dense integrated circuits at low cost has enabled a plethora of mobile devices, and particularly wireless mobile devices, to become prevalent around the world to the point of being ubiquitous. Mobile devices having wireless capability and found throughout the world today include, for example, mobile telephones, personal digital assistants (PDAs), laptop computers, global position sensor (GPS) devices. These devices typically operate in the radio frequency (RF) and microwave wireless signal frequency ranges.

The electronics for communicating at RF and microwave frequency requires transmitters and receivers with electric signal filters to assist in producing and/or discriminating between wanted signals and unwanted signals. However, it is difficult to build an electric signal filter for wireless communication that has ability to discriminate between wanted and unwanted signals as well as desired. Therefore, the electric signal filters are tuned after being made or manufactured, so that they are better at producing and/or discriminating between wanted and unwanted signal frequencies.

Electric filters for wireless communication include, for example, cavity type filters and planar type filters. Electronic filters such as the planar filter may include a series of resonators coupled together. High performance planar filters, for example high temperature superconductor filters (HTS), have been developed to provide extremely accurate filtering to improve the quality of wireless communications, particularly in areas having a high density of wireless devices or where the RF or microwave signals may not propogate well. See, for example, U.S. patent application Ser. No. 10/944,339 "Stripline Filter Utilizing One or More Inter-resonator Coupling Members" which is hereby incorporated herein by reference for all purposes.

Planar filters are usually patterned on high dielectric constant substrates and designed to be very compact in size. Using the precise lithography techniques developed for semiconductor processing, couplings that are well repeatable within in acceptable range can be produced. Unlike cavity filters, planar filters do not generally require tuning of the couplings because the filter response is less sensitive to coupling variations than resonant frequency variations. However, substrate thickness variations and/or process variations such as etching conditions are likely to cause unacceptable resonant frequency variations of planar filters, and thus require tuning of planar filters.

Several tuning techniques have been used for planar filters, for example high performance superconductor filters, have been developed. Maintaining high-performance in the filter design stage or in manufacturing requires a stable tuning process. There are two main approaches to planar filter tuning. The first approach, mechanical tuning, is widely used in the industry. Filters may be tuned mechanically by moving elements such as dielectric rods or conductive tips within the electromagnetic field near resonators. For example, tuning screws may be used to move the dielectric rods or conductive tips up and down over the resonators. For superconductor filters, sapphire rods or superconductor-coated tips may be used on the tuning screws. Sapphire rods may placed at high electromagnetic field area over resonators and tune resonant frequency by changing shunt capacitance to ground. Superconductive tips can be used for magnetic and/or electric field tuning, but usually they are applied to the electromagnetic field because it can tune more effectively. The tip changes the electromagnetic field surrounding the resonator(s) and varies inductance of resonator(s). One exemplary method of providing mechanical tuning is described in U.S. Pat. No. 5,968,876 by Sochor, which is hereby incorporated by reference herein for all purposes.

One advantage of the mechanical tuning approaches is reversibility. Filters are tuned through a trial and error process by moving the tuning elements or screws up and down. Later on, tuning still can be adjusted if it is necessary. One disadvantage of mechanical tuning is that the tuning elements or screws can potentially impact the resonant frequencies of other resonators or inter-resonator couplings when they are applied, especially when they are placed close to the circuit. In reality, that happens often. The variation in coupling ultimately limits the filter's tuning range. This effect can be minimized by taking it into account during filter design. Designers may arrange resonators tuning locations away from each other and away from the couplings to avoid that impact. This concern and approach limits freedom of design of planar filters. There are other issues that may be caused by having mechanical part. For example, metallic or dielectric flakes may drop from mechanical elements or screws during and after tuning. These flakes may affect the filter Q-factor and also change tuning as they are free to move around on the circuit. The tuning elements also need to be fixed or locked in location after the tuning is finished to keep the filter's performance constant.

The second approach is done by processing and does not need mechanical parts. A couple of methods, such as laser trimming a portion of the filter trace or depositing a thin dielectric layer over the filter trace have been reported. One exemplary laser trimming technique is shown in the article by Parker, Ellis and Humphreys, Tuning Superconducting Microwave Filters By Laser Trimming by Goodyear, IEEE MTT-S Digest, 2002, which is hereby incorporated herein by reference for all purposes. One exemplary dielectric deposition technique is described in the article by Tsuzuki, Suzuki, and Sakakibara, Superconducting Filter for IMT-2000 Band, IEEE Transactions on Microwave Theory and Techniques, Vol. 48, No. 12, December 2000, which is hereby incorporated herein by reference for all purposes. These approaches will result in permanent tuning changes, and should not change once they are set. Thus, there is no chance to retune or readjust the filter. Hence, tuning must be done very carefully so that the filter is not permanently ruined.

In general, the second approach is preferable to the first approach, even though the first approach is predominantly used. However, there are two major issues that must be resolved in order to realize the second approach. First, a reproducible tuning process must be developed. Second, a robust method that provides a tuning recipe is needed. Both must be very accurate since the tuning is generally not reversible. It would be beneficial if a filter design may be provided that is insensitive to trimming accuracy so as to often tune filters accurately. The present invention provides a number of approaches to filter tuning and design which meet these requirements.

SUMMARY

The present invention is directed generally to providing methods, systems and apparatus for filter design, analysis and/or adjustment. More specifically, embodiments may include systems, methods, and apparatus relating to electronic filter design and tuning.

Such embodiments may include, for example, a plurality of steps that will result in improved filter tuning. A filter may be operated at an expected operating temperature to determine various initial or pre-tuning performance characteristics. Parameter extraction may then be performed by, for example a network analyzer and a computer. For example, measured S-parameter response (e.g. return loss) may be used to determine various parameters associated with the filter. Next, filter response may be optimized by, for example, a computer. In various embodiments, the couplings (e.g., between resonators of a filter) may be kept constant and the frequency may be adjusted to optimize the filter's S-parameter response. Then a difference between the extracted filter characteristics and the optimized filter characteristics may be determined and used to provide a tuning recipe. The filter may then be tuned according to the tuning recipe. In various embodiments this tuning may be done by cutting or trimming a portion of the filter, a tuning fork coupled to a portion of the filter, and/or a trimming tab coupled to a portion of the filter. Once the filter has been tuned, it may be checked. For example, the filter may again be operated at its operating temperature and measured to determine the filter's new performance characteristics. If the new tuned performance characteristics are acceptable, the filter may be packaged for operation. If the new performance characteristics are not acceptable, the filter may be tuned again or scrapped. However, it should be noted that the present invention enables most filters may be properly tuned in the first tuning.

In at least one embodiment, the parameter extraction method may be used to diagnose the "turn on" state of the filter. The cross coupling(s) of various resonators of a multi-resonator filter may be treated as constants during extraction. In various embodiments, only dominant parasitic couplings along with main couplings may be utilized to obtain more accurate result. Further, multiple data sets may be utilized in order to avoid local minimum solutions caused by the existence of parasitic coupling(s) and/or a "dirty window" (e.g., connectors, bondings, transmission lines, cables, etc., needed to connect the filter to the instrumentation used to measure the filter performance). Then an optimization of the filter response may be performed based on the diagnosis information from parameter extraction. For example, the return loss may be optimized allowing slightly narrower bandwidth by using extracted couplings, but changing only the resonators.

Further, the rejection response may be optimized as well by allowing the return loss to be slightly degraded.

In at least one embodiment, the invention may include a design technique and filter design for high-performance planar filters. The technique provides one or more tuning elements that enable filter tuning by, for example, hand scribing, and a parameter extraction based technique to determine what should be scribed. In a multi-resonator planar filter, each resonator may have a tuning element, for example a tuning fork, that provides shunt capacitance to ground. The tuning fork may be coupled to the resonator by means of a series capacitor or connected directly to the resonator. However, sensitivity to error in scribing is decreased if the tuning fork(s) is connected directly to the resonator. The series capacitor can be designed to reduce the tuning sensitivity to approximately 10% of what would be seen if the tuning fork was directly connected to the resonator. This reduced sensitivity enables tuning by hand, e.g. with a mechanical device such as a diamond scribe pen. The hand scribing may be performed with a diamond scribe pen under a microscope. Alternate means of scribing the tuning fork, such as a laser scribing tool may also be employed. In any case, the resonator may be tuned by physically disconnecting (e.g., scribing) part of the tuning fork or shunt capacitor. For accuracy and ease of tuning, the tuning fork may also include a scale and/or numbering. Further, different capacitance tuning forks may be provided to give both course and fine tuning. A parameter extraction based technique may be used to diagnose the filter couplings and resonant frequencies, and to provide a recipe for scribing the tuning forks. As such, a filter design is provided that realizes very accurate tuning without requiring any expensive tools. However, in one variation, a laser trimming machine may be used to physically disconnecting a portion of the tuning fork or shunt capacitor.

In at least one other embodiment, the invention may include a procedure for tuning a planar filter including planar tuning elements. A planar filter including a planar tuning element may be provided. Various filter characteristics, for example, the frequency and return loss may be analyzed to determine if tuning is needed. If tuning is needed, calculations are performed to determine how to correctly tune the planar filter. For example, filter response optimization may be performed and a tuning recipe may be developed. Then, one or more tuning elements may be adjusted so that at least a portion of the filter is correctly tuned.

In at least one other embodiment, the invention may include providing one or more trimming tabs on a resonator edge that may be, for example, trimmed (i.e. disconnected from the circuit) for filter tuning. The trimming tabs may have discrete values that shift a resonant frequency of the filter by different known amounts, and the amounts may be configured in a binary progression. For example, the filter may have four trimming tabs on each resonator that can shift resonant frequency in a binary progression such as 800 kHz, 400 kHz, 200 kHz and 100 kHz. Additional tabs may be provided for coarse and/or fine tuning such as a 1500 kHz tab and/or additional 100 kHz tabs. The filter may be tested (e.g., at operating temperature) to determine its characteristics and parameter extraction may be performed. Then parameter optimization may be performed to determine, for example, the frequency shift for each resonator in the filter. From this information a tuning recipe may be generated indicating which of the trimming tabs should be disconnected or trimmed from the resonator(s) edge(s) so as to produce a properly tuned filter. The trimming tabs may be severed from the resonator(s) using a laser or mechanical scribing apparatus.

The methods, systems and apparatus provided herein may be particularly well suited for tuning planar filters that may be used in RF and microwave applications. In various embodiments, the planar filters be made of a high temperature superconductor material (HTS).

The parameter extraction and optimization techniques of the present invention are not limited to the filter designs used our development such as trimming tab resonator and tuning fork resonator filter designs. These techniques are also applicable to mechanical tuning such as dielectric tuning filters and HTS tip tuning filters. However, as described herein they are particularly effective for trimming tab resonator and tuning fork resonator filter designs.

Some of the advantages of the processing approaches provided herein are (1) filters that have simpler structure and lower cost because there are no mechanical parts required for tuning, (2) filters that are more reliable because the tuning is permanent, and (3) filters is more freedom of design layout due to the lack of mechanical tuning elements or screws that need to be taken into consideration during the design layout of planar filters.

Still further aspects included for various embodiments are apparent to one skilled in the art based on the study of the following disclosure and the accompanying drawings thereto.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and:

FIG. 11 is an extracted coupling matrix for the filter shown in FIG. 9, according to at least one embodiment;

FIG. 14 is a table of the recipe for tuning resonators 1-10 for filter shown in FIG. 9, according to at least one embodiment;

FIG. 22 is a block diagram for a further simplified equivalent circuit model for the non-ideal filter environment, according to at least one embodiment.

DETAILED DESCRIPTION

The present invention is directed generally to filter design, analysis and adjustment. Various embodiments may include, for example, methods, systems and apparatus for electric filter tuning. Embodiments may also include design techniques for planar electric filter tuning. The methods, systems and apparatus of the present invention may be particularly well suited for tuning planar filters that may be used in RF and microwave applications. In various embodiments, the planar filters be made of, for example, a high temperature superconductor (HTS) materials such as $YBa_2Cu_3O_{7-\delta}$ (YBCO). Embodiments of the present invention may also include parameter extraction, optimization and tuning recipes techniques. These techniques are not limited to applications with the filter designs used herein, such as trimming tab resonator and tuning fork resonator filter designs. These techniques may also applicable be applicable to mechanical tuning such as dielectric tuning filters and HTS tip tuning filters. However, the techniques described herein are particularly effective for trimming tab resonator and tuning fork resonator filter designs.

In at least an embodiment of the present invention a technique for filter tuning is provided which may include parameter extraction, optimization and tuning recipes techniques that may require only a single permanent filter tuning. In at least another embodiment a system and method of filter design, analysis and adjustment according to the present invention includes use of tuning that may be set using a mechanical scribing tool or a laser trimming device. In at least one other embodiment, a filter tuning technique may be provided and include providing trimming tabs on a resonator edge that may be disconnected or trimmed for filter tuning.

Figure 1:
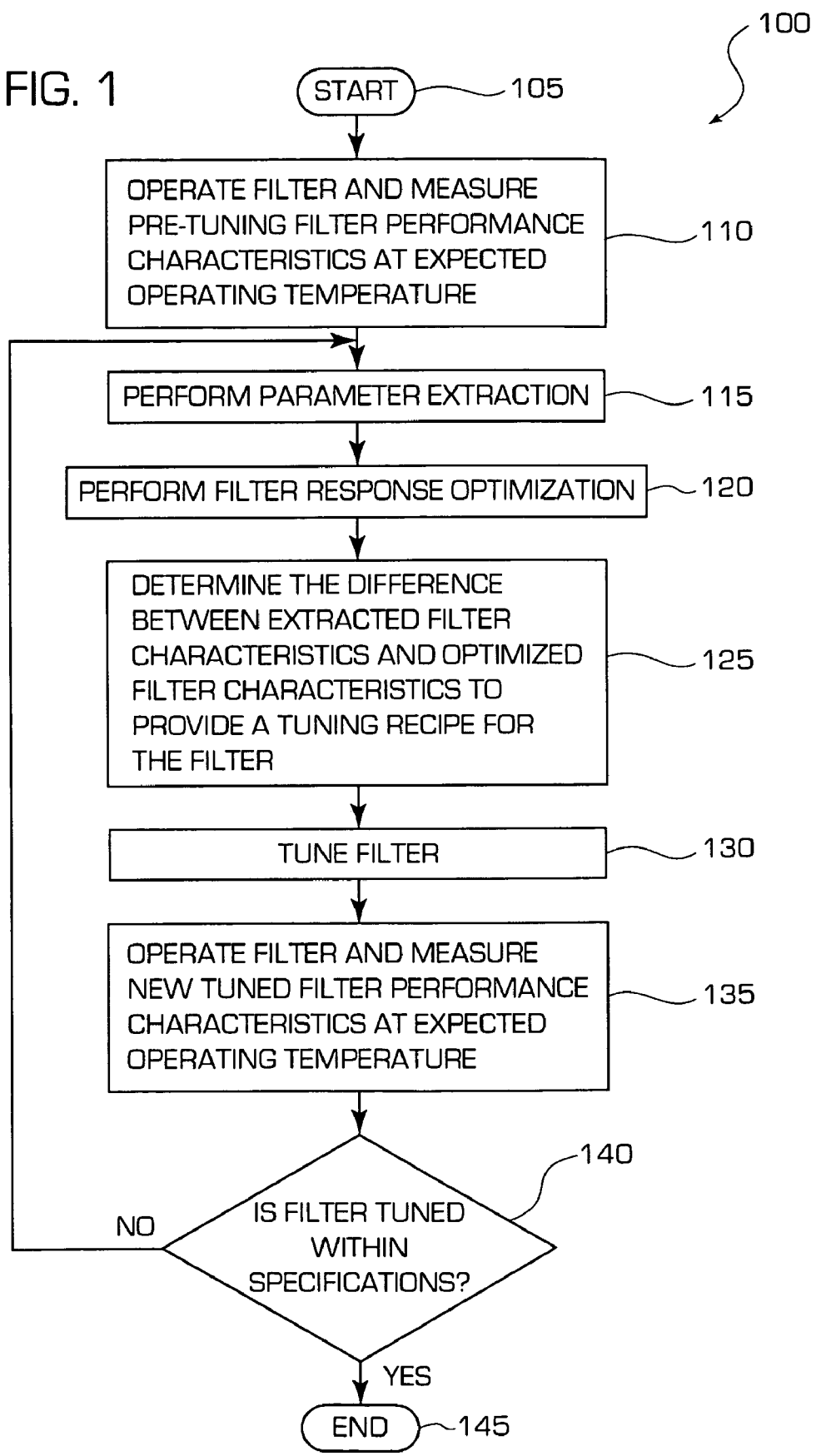
FIG. 1 is a flowchart of a method of tuning a filter according to at least one embodiment.

Referring to FIG. 1, a method for tuning a filter is provided. This embodiment may include a plurality of steps 110-140 that will result in improved filter tuning. At 110, a filter may be operated at an expected operating temperature to determine various initial or pre-tuning performance characteristics. For example, an HTS filter may be operated at 77 degrees K and measurements taken. At 115, parameter extraction may then be performed by, for example a network analyzer (shown as item 235 in FIG. 2). For example, measured S-parameter response (e.g. return loss) may be used to determine various parameters associated with the filter. Next, at 120, filter response may be optimized by, for example, a computer (shown as item 205 in FIG. 2). In various embodiments, the couplings (e.g., between resonators of a filter) may be kept constant and the frequency may be adjusted to optimize the filter's S-parameter response. Then at 125 a difference between the extracted filter characteristics and the optimized filter characteristics may be determined and used to provide a tuning recipe. At 130, the filter may then be tuned according to the tuning recipe. In various embodiments this tuning may be done by, for example, cutting or trimming a portion of the filter, a tuning fork coupled to a portion of the filter, and/or a trimming tab coupled to a portion of the filter. Once the filter has been tuned, it may be checked. For example, at 135 the filter may again be operated at its operating temperature and measured to determine the filter's new performance characteristics. If the new tuned performance characteristics such as frequency response and/or S-parameter response are acceptable, the filter may be packaged for operation. The method provided herein will often result in acceptable filter performance after a single iteration of the aforementioned tuning procedure, and at 145 the method of tuning will end. However, if at 140 the new performance characteristics are not acceptable, the filter may be tuned again or scraped. It should be noted that the use of the parameter extraction, filter performance optimization, and tuning recipe procedure provided herein enables most filters to be properly tuned in the first tuning.

Figure 2:
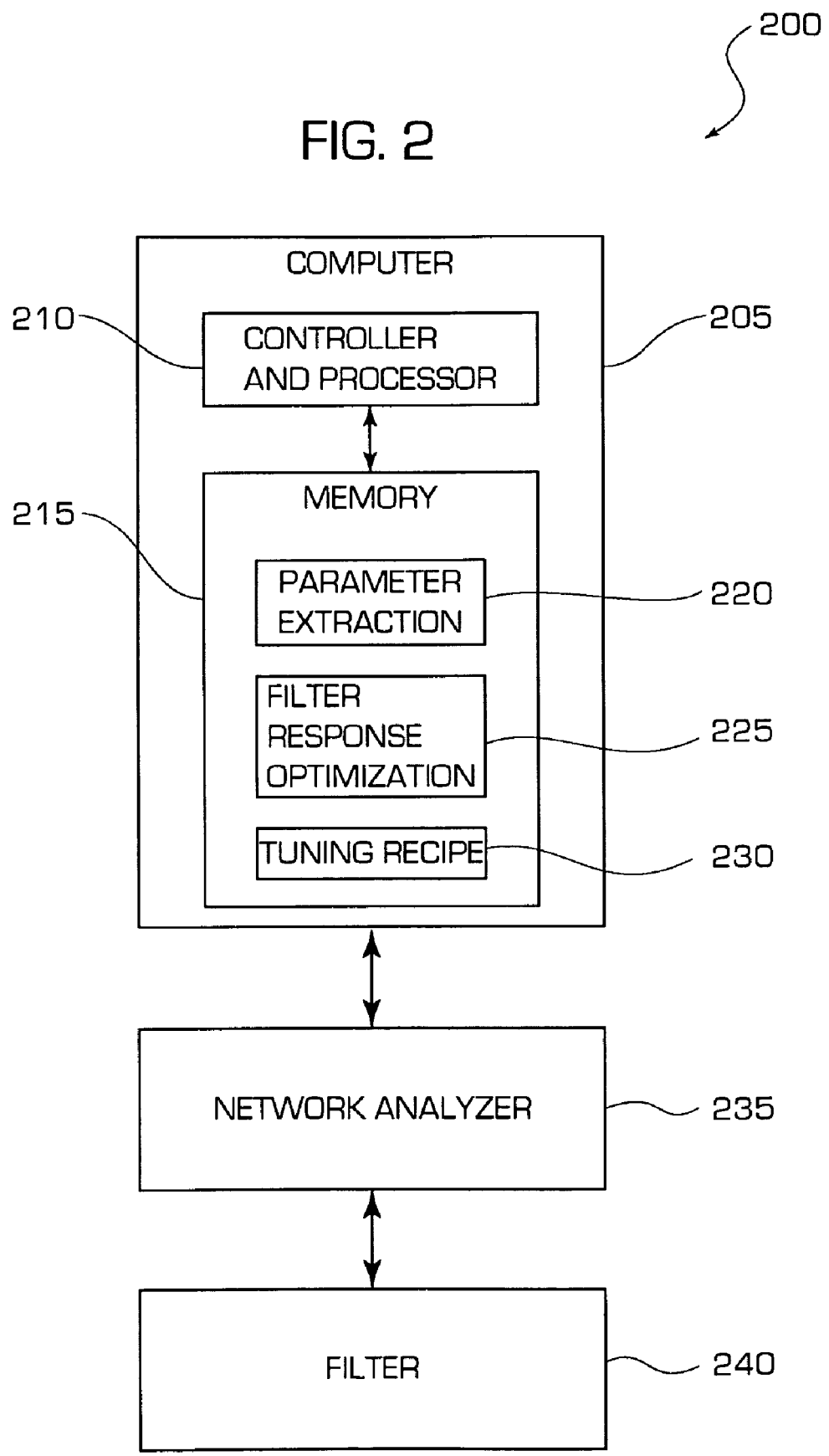
FIG. 2 is a block diagram illustrating a system for filter tuning according to an embodiment.

Referring to FIG. 2, a block diagram illustrating a system for filter tuning according to an embodiment of the present invention is provided. In this example, a computer 205 may coupled to a network analyzer 235 and the network analyzer 235 may be coupled to a filter to be tested and tuned. The filter 240 may be coupled to the network analyzer 235 using RF cables. The computer 205 may be a personal computer (PC) or any other type of computer capable of performing the analysis and computations necessary for filter tuning. The computer 205 may include a controller and processor 210 and a memory 215. The memory may contain parameter extraction 220, filter response optimization 225 and tuning recipe 230 information. In operation, the network analyzer 235 may perform parameter extraction and the parameter extraction information 220 may be stored in memory 215. The computer 205 controller and processor 210 may then use a program to generate filter response optimization information 225 that is stored in memory 215. Next, the controller and processor 210 may use a program to generate tuning recipe information 230 that may assist an operator or automated tuning system to tune the filter 240 to desired performance characteristics. In various embodiments, the filter 240 may be set to a device operating temperature. For example, a cryostat (not shown) may be used in which the filter is disposed so as to reduce the temperature of an HTS filter to operating temperature of, for example, 77K.

Figure 3:
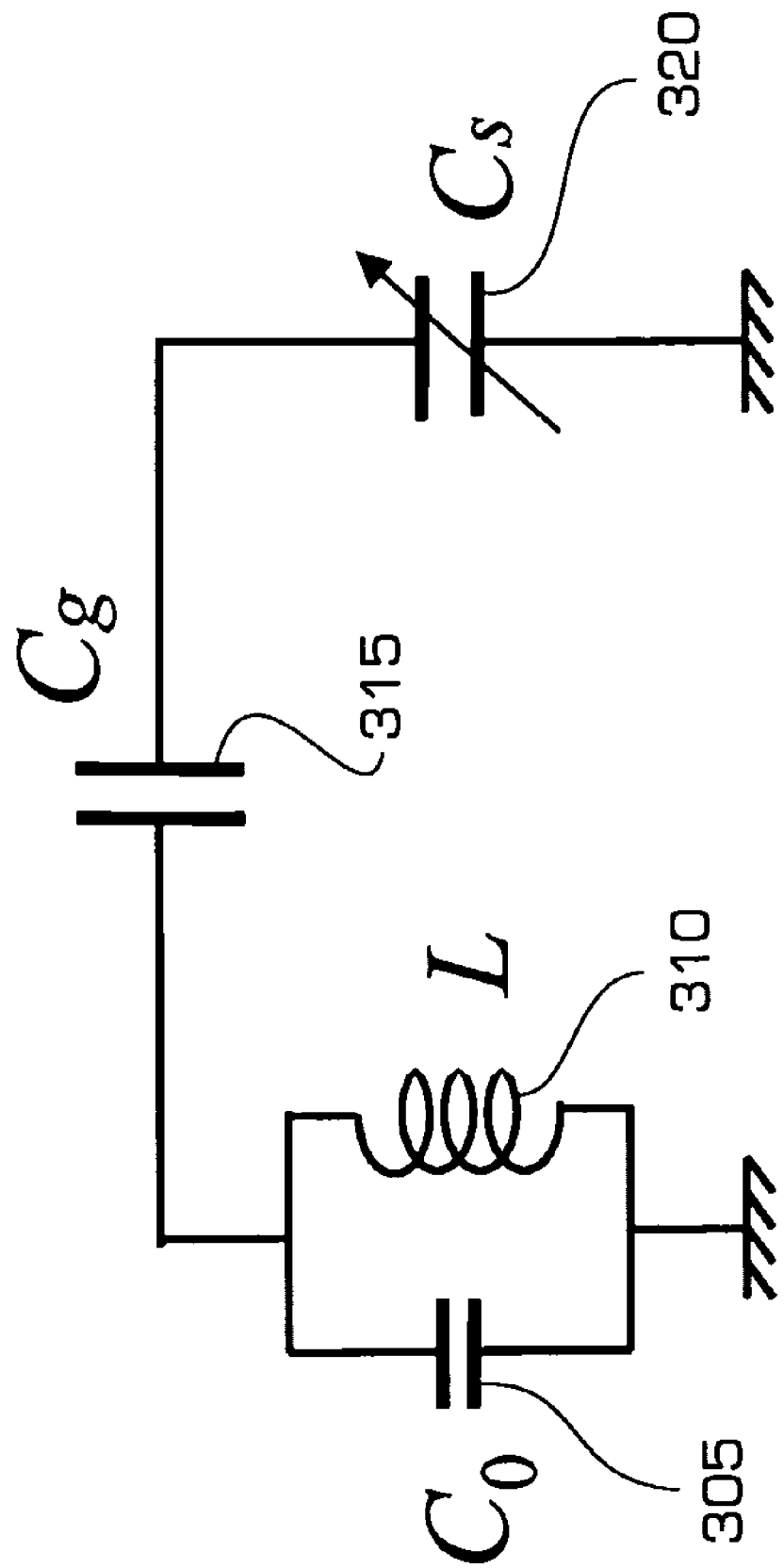
FIG. 3 is a circuit diagram of a filter and tuning element according to an embodiment.

Referring now to FIG. 3, a circuit diagram for an equivalent circuit of an exemplary filter and tuning element are provided, according to an embodiment of the present invention. In this example, a filter resonator may be modeled simply ad a capacitor $C_0$ 305 and inductor L 310. The tuning element is modeled as a variable shunt capacitor $C_s$ 320 and is coupled to the resonator (305 and 310) by a gap capacitor $C_g$. However, in one variation the tuning element is variable shunt capacitor $C_s$ 320 may be directly connected to the resonator (305 and 310). The resonator may be tuned by changing shunt capacitor to ground $c_s$ 320.

Figure 4:
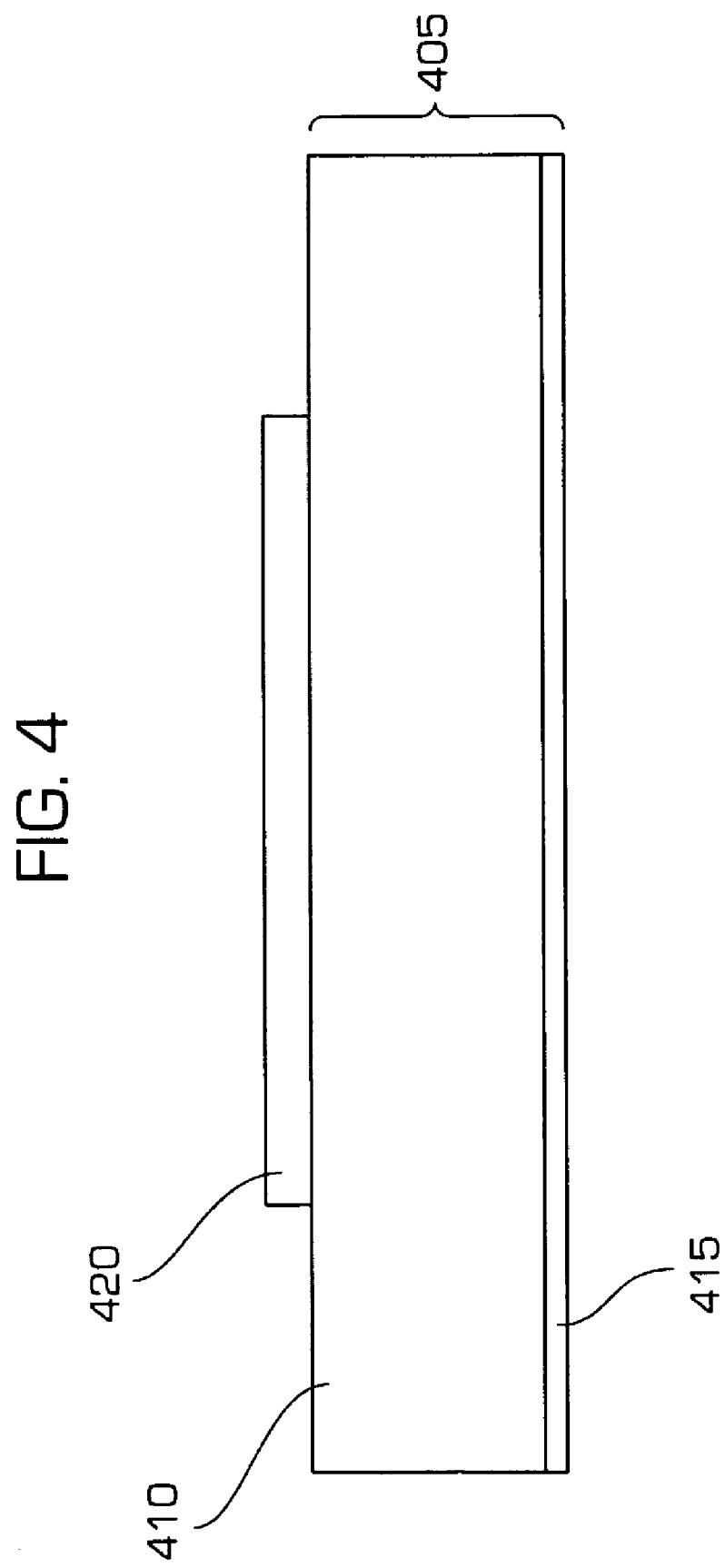
FIG. 4 is a side view of a planar filter device with tuning element according to at least one embodiment.

Referring to FIG. 4, a side view of a planar filter device with tuning element is provided, according to at least one embodiment. In this example, a filter structure 405 may be formed by forming one or more resonators and tuning devices 420 on a substrate that may include a dielectric substrate or material 410 and a ground plane 415. Typically, the resonators and tuning devices 420 and ground plane 415 are made from a conductive material such as a gold or copper. In the case of microwave filter structure, resonators and tuning devices 420 and ground plane 415 may be made from an high temperature superconductor (HTS) materials such as $YBa_2Cu_3O_{7-\delta}$ (YBCO).

Figure 5:
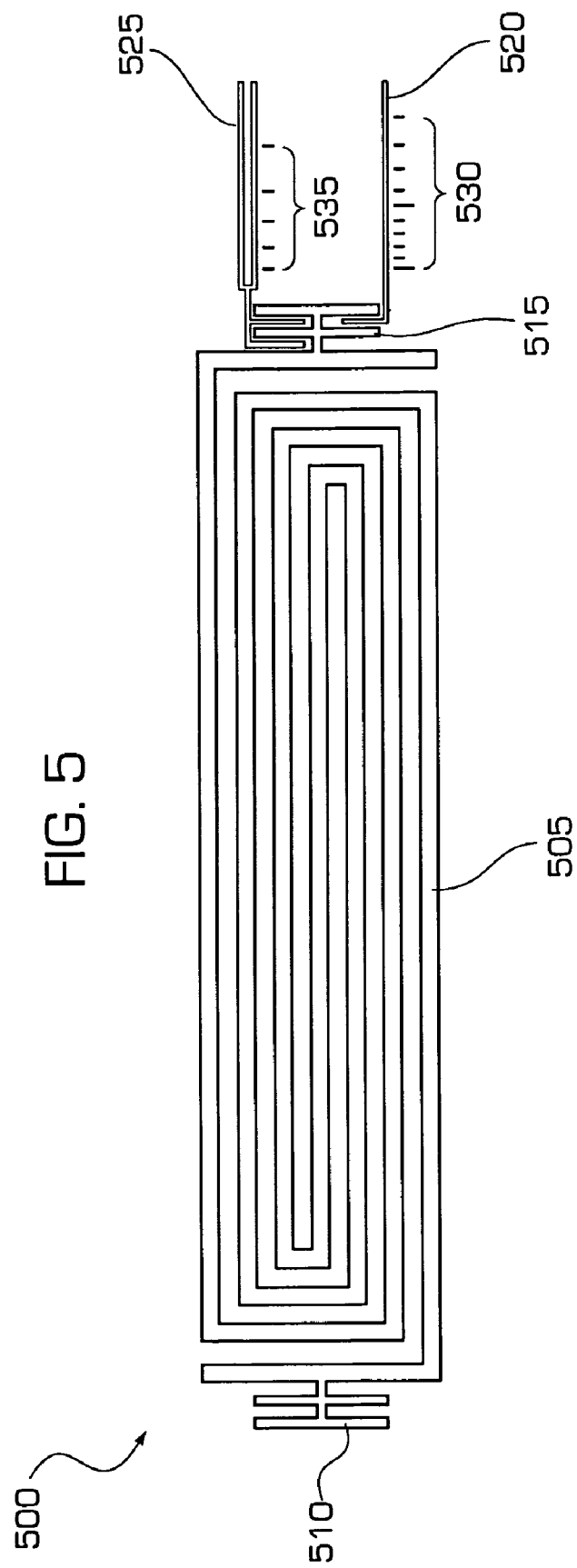
FIG. 5 is a top view layout of a planar filter device with tuning elements according to at least one embodiment.

Referring to FIG. 5, a top view layout of a planar filter device with tuning elements is provided, according to at least one embodiment. FIG. 5 shows an exemplary resonator 505 formed with spiral-in and spiral-out (SISO) shape half-wavelength structure that may be represented using the circuit diagram of FIG. 3. A complete filter may include multiple resonators 505, for example, eight or ten resonators 505 in series. The SISO trace 505 may be made of metal as described for the resonators and tuning devices 420 shown in FIG. 4. Some details for such devices may be found in, for example, the article by Gregory L. Hey-Shipton, Efficient Computer Design Of Compact Planar Band-pass Filters Using Electrically Short Multiple Coupled Lines," 1999 IEEE MTT-S Int. Microwave Symp. Dig., June 1999, which is hereby incorporated by reference for all purposes. The invention should not be construed as being limited to only SISO and SISO-like resonators, but is broadly applicable to a wide range of resonator types such as those described in U.S. Pat. No. 6,895,262 titled High Temperature Superconducting Structures and Methods for High Q, Reduced Intermodulation Structures, U.S. patent application Ser. No. 10/480,743 titled Resonator and Filter Comprising the Same, U.S. patent application Ser. No. 10/391,667 titled Narrow-Band Filters with Zig-Zag Hairpin Resonator and the article Highly-Selective Electronically-Tunable Cryogenic Filters Using Monolithic, Discretely-Switchable MEMS Capacitor Arrays, E. M. Prophet, J. Musolf, B. F. Zuck, S. Jimenez, K. E. Kihlstrom and B. A. Willemsen, IEEE Transactions on Applied. Superconductivity, 15, 956-959 (2005), which are all references hereby incorporated by reference for all purposes. The device 500 in this example may be named a "Tuning Fork Resonator" design and be tuned using, for example, hand scribing or laser scribing. One or more "Tuning Fork" tuning element(s) 520 and 525 made of metal material may be connected to the resonator 505 through a series inter-digitated capacitor $c_g$ 315 via structure 515, at one end of the resonator. Although two tuning fork elements 520 and 525 are shown herein, one or more tuning forks may also be used depending on the tuning range and tuning resolution required. The tuning fork element(s) 520 and 525 may be electrically floating from the resonator 505. Further, tuning fork element(s) 520 and 525 may include scales 530 and 535, respectively, to provide ease of scribing. The scale may be related to a tuning recipe (described in more detail below). Note, that at the other end of the resonator 505 a structure 510 enabling interdigitated coupling may also be included. As will be discussed in more detail below, structure 510 may be used for coupling together two or more resonators 505 included in a planar filter.

Frequency tuning of the resonator 505 may be implemented by scribing away portions of one or more of the floating tuning fork(s), for example tuning fork 530. This has the effect of reducing the shunt capacitance $c_s$ 320 of the floating part (between 315 and 320), as shown in equivalent circuit in FIG. 3. In this case, the total capacitance of a resonator can be described as:

$$C_0 \to C = C_0 + H$$

$$H \equiv \frac{C_g C_s}{C_g + C_s}$$

Original frequency $f_0$ may change to $f$ by including the tuning fork structure.

$$f_0 \to f = \frac{1}{2\pi\sqrt{L(C_0 + H)}} \cong f_0\left(1 - \frac{1}{2}\frac{H}{C_0}\right) = f_0 + \Delta f$$

Sensitivity of frequency shift can be evaluated by derivative of $\Delta f$ by $c_s$:

$$\frac{d\Delta f}{dC_s} = -\frac{f_0}{2C_0}\frac{dH}{dC_s}$$

The sensitivity factor $$\frac{dH}{dC_s} = \frac{C_g^2}{(C_g + C_s)^2}$$

represents sensitivity ratio to the case when the fork is directly connected to resonator and a part of resonator is scribed without any decoupling structure.

Figure 6:
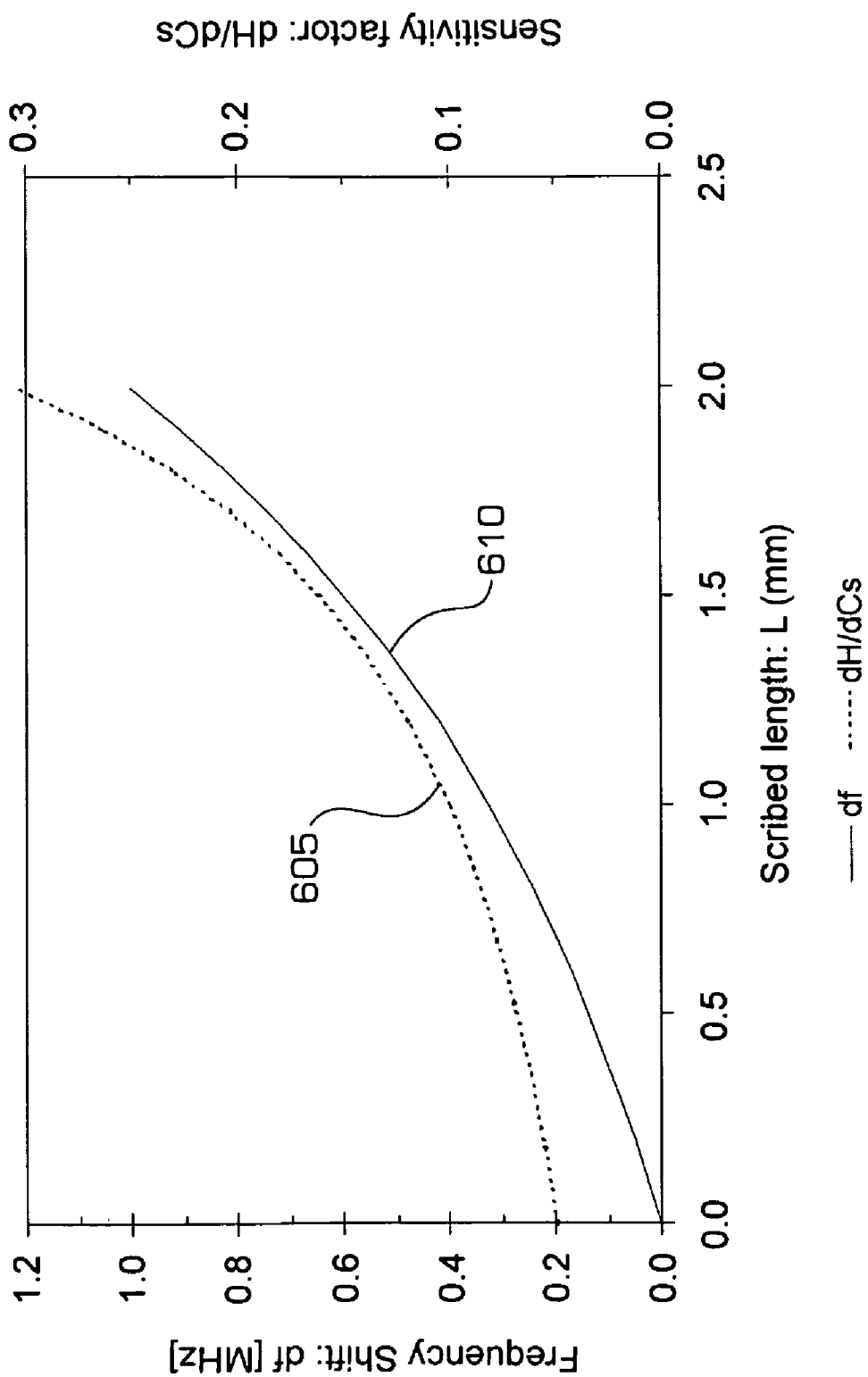
FIG. 6 is a graph of the tuning range and sensitivity for one of the tuning forks shown in FIG. 5, according to at least one embodiment.

FIG. 6 shows frequency shift and the sensitivity factor to scribed length L calculated for the example shown in FIG. 5, tuning fork element 520. The calculations may be done using a computer program, for example Momentum provided by Agilent Technology. As shown by curve 610, this particular exemplary tuning fork element 520 may be designed to be able to tune by approximately 1 MHz as maximum delta when the fork is scribed at approximately 2 mm, which is almost the full length of the tuning fork. The sensitivity factor varies from approximately 0.05 to 0.3 over the range shown in FIG. 6, as indicated by curve 605. Thus, as indicated by curve 610, in this example the sensitivity is approximately 12 kHz/50 µm at L=0 and 46 kHz/50 µm at L=2.0 mm. If in another embodiment, the tuning fork 520 may be directly connected to the resonator 505 and the frequency shift 610 amount may be approximately 9.2 MHz when the tuning fork 520 is scribed at 2.0 mm. This may be defined as a fine tuning tuning fork 520, relative to tuning fork 525. Further, in the case of the tuning fork 520 being directly connected to the resonator 505, the sensitivity obtained from curve 610 may be approximately 230 kHz/50 µm and that would be constant over the range (straight line), unlike the example where the tuning fork is decoupled as shown in the figures. The use of capacitive coupling for the tuning fork(s) 520 and 525 provides for reduced sensitivity and may facilitate use of less accurate mechanical scribing techniques for tuning the resonator(s) 505. For example, in this case the design is capable of being tuned using hand scribing using a mechanical scribe device. The maximum sensitivity factor H in the tuning range provided in FIG. 6 may be less than 30% of an embodiment where the tuning element 520 is connected directly to the resonator 505. In one embodiment, for example, a 50 (+/−25) µm precision may be achieve using a diamond scribe pen under a microscope. In this case it may be possible to realize, even for an inexperienced person tuning the device, a single tuning fork 520 being tune and resulting in the tuning of the resonator 505 within approximately 50 kHz precision over the 1 MHz range. Sensitivity and tuning range can be adjusted by changing series capacitance $c_g$ 315 between resonator 505 and the tuning element(s) 520 and 525. Tuning becomes less sensitive by decreasing the series capacitance $c_g$ 315, but it may also need more shunt capacitance to ground $C_s$ 320 to keep the same amount of tuning range, which may result in longer tuning fork. In any case, the various design parameters should be determined for needed tuning range, acceptable sensitivity and realizable physical size of the tuning fork.

Figure 7:
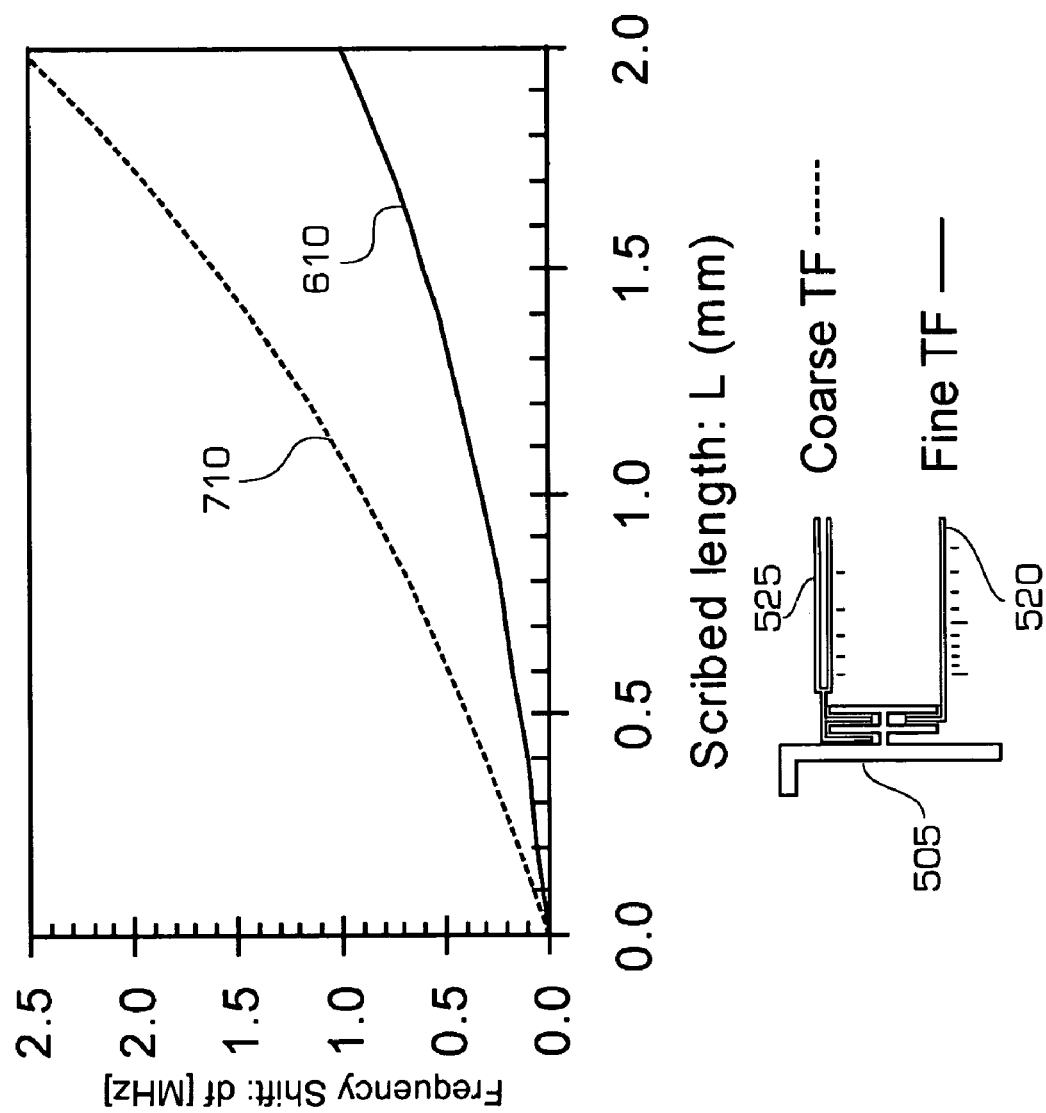
FIG. 7 is a graph of the tuning range for both of the tuning forks shown in FIG. 5, according to at least one embodiment.

FIG. 7 is a graph of the tuning range and frequency shift for both tuning forks 520 and 525 shown in FIG. 5, according to at least one embodiment. In this graph, the scale is larger to accommodate curve 710 for the more course tuning fork 525, due to additional surface area and shunt capacitive coupling. The second tuning fork 525 may provide approximately 2.5 MHz of tuning. The tuning capability of tuning fork 525 of 2.5 MHz may be added to the first tuning fork 520 capability of 1 MHz, so as to expand the total tuning range to 3.5 MHz. However, the sensitivity of the second tuning fork 525 is not as good as the sensitivity of the first tuning fork 520, because of its wider tuning range. In one variation, if 2.0 MHz of tuning was adequate for tuning most of the resonators 505, we could have used two of the same size and type tuning forks and preserved the tuning sensitivity. As noted above, and described below in more detail, scales 530 and 535 and numbers (shown below) may be marked along the forks to make hand scribing more easy.

Figure 8:
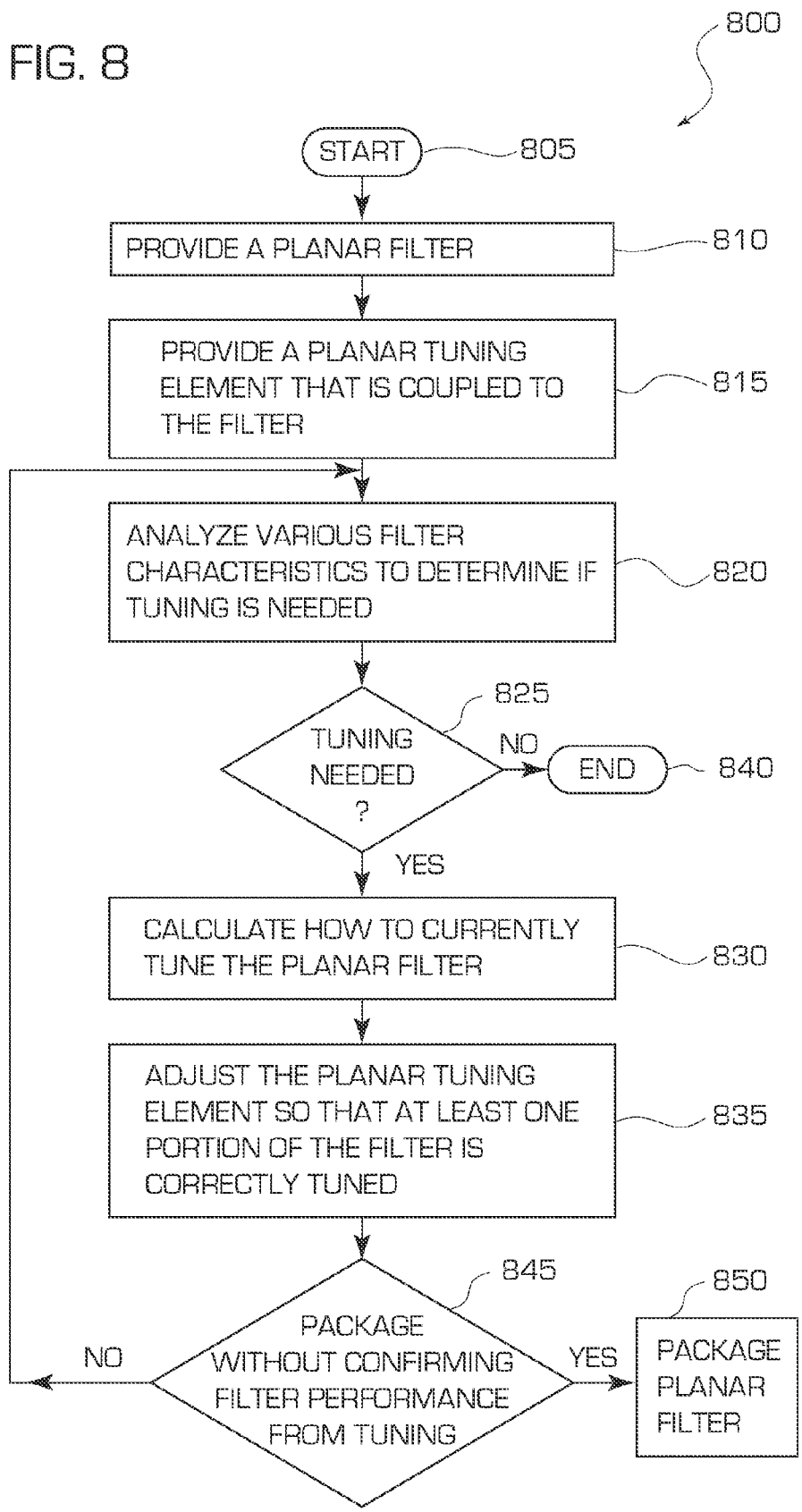
FIG. 8 is flowchart of a method of tuning a filter according to at least one embodiment.

FIG. 8 is flowchart of an exemplary method of tuning a filter according to at least one embodiment. At 810, a planar filter may be provide for tuning. This planar filter may be manufactured according to processing and design techniques well known to those skilled in the art and the techniques described herein. The planar filter may include one or more resonators (e.g., resonator 505). At 815, a planar tuning element (e.g., tuning forks 520 and/or 525) may be provided and coupled or connected to the filter so as to enable tuning of the filter. At 820, the filter assembly may be analyzed and various filter characteristics measured so as to determine if the filter needs to be tuned to a desired filter performance. These measurements may be provided by a network analyzer or other measurement device. Filter performance parameters may be extracted. The desired filter performance characteristics may be programmed into or derived using, for example, a computer. This may include performing filter response optimization. At 825, the desired predetermined filter performance characteristics may be compared to the measured filter characteristics to determine if filter tuning is needed. If filter tuning is needed, then at 830 it is calculated how to correctly tune the planar filter. In this case, a filter tuning recipe may be generated. Than at 835, one of more planar tuning elements may be adjusted, by for example scribing, so that at least one portion or resonator of the filter is correctly tuned. Once tuned, the filter performance may again be analyzed to determine if any further tuning is needed in steps 820 and 825. Alternatively, the filter may be packaged for use without confirming performance.

Figure 9:
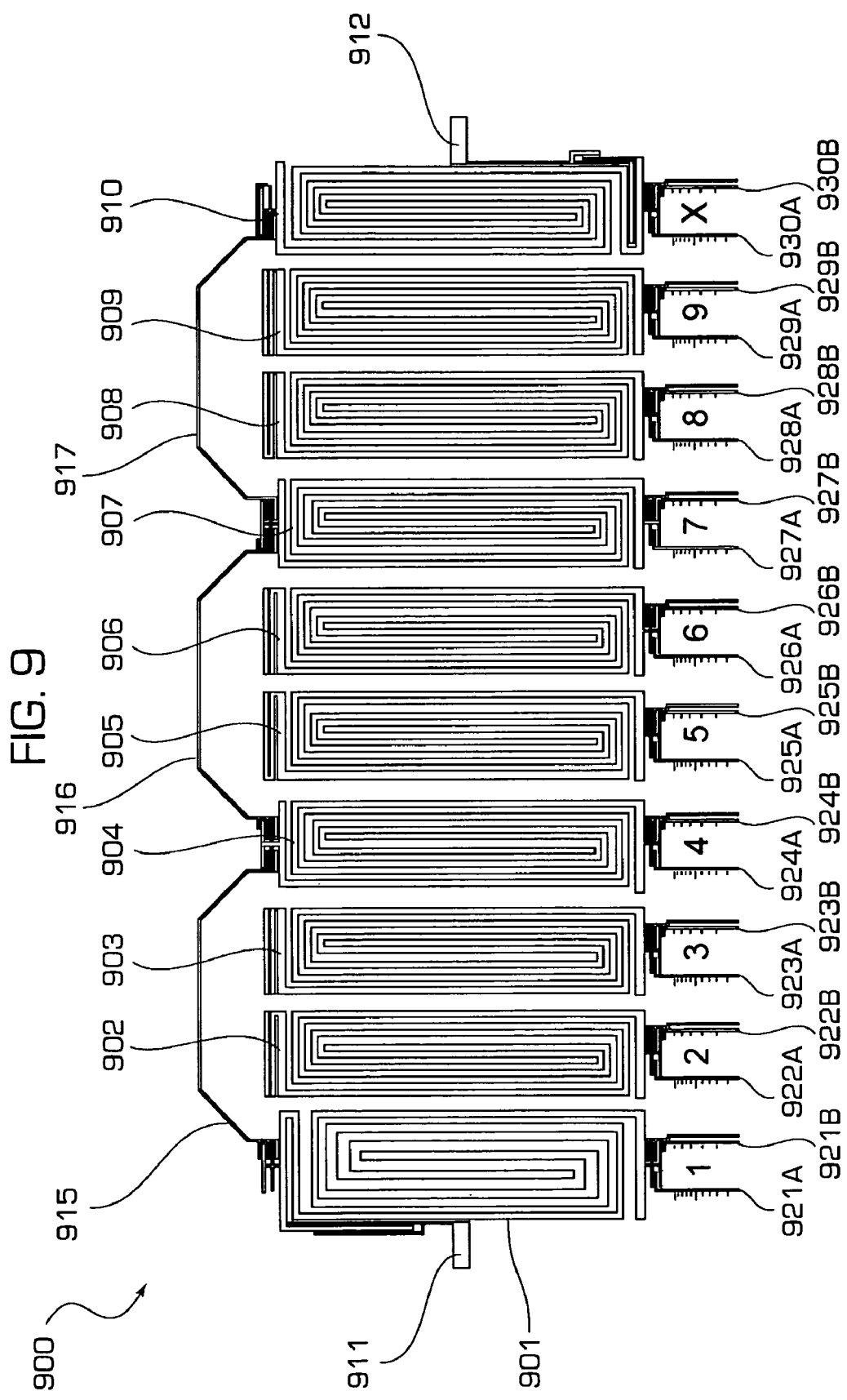
FIG. 9 is a top view layout of a multi-resonator planar filter device with tuning fork tuning elements according to at least one embodiment.

Referring to FIG. 9, a top view layout of one exemplary filter design including a multi-resonator planar filter device with two tuning fork tuning elements per resonator is provided, according to at least one embodiment. As an exemplary filter design example, an 800 MHz cellular B-band filter 900 is shown from a top view. The filter layout may be, for example, a 10-pole AMPS-B filter 900. As such, ten resonators, 901 through 910 (901-910), may be provided in series and are cross-coupled together. The filter chip dimension may be, for example, a 34 mm by 18 mm so that two filters may be fabricated on, for example, a 2-inch MgO wafer. The design pass band may be designed to be from 834.8 MHz to 849.7 MHz with a return loss of 22 dB. Of course, the filter 900 may be designed for a different desired pass band and return loss or as a band gap filter or any other type of filter typical in the art. In this example, the filter 900 may include three quadruplet cross couplings, 915, 916, and 917, that may produce three transmission zeros at each rejection side. Those values may be designed such that three bounce back peak levels may occur at 70 dB. The cross couplings 915, 916, and 917 may be implemented at one side of the resonators array (e.g., the top side) by additional transmission lines and may be capacitively coupled to resonators 901-910 via coupling elements 510. Tuning forks 921A through 930B may be hung at the other side of the resonators array 901-910. Although two tuning forks are couple to each resonator in this example, one skilled in the art would understand that one tuning fork or more that two tuning forks may be attached to each resonator. In this example, two tuning forks (e.g., 921A and 921B) that may give different tuning ranges are coupled to a respective resonator hung at the bottom of each resonator. As described above with respect to resonator 505, numbers and scales may be provided beside tuning forks allows hand scribing easier. The numbers 1-9 and X (i.e., 10) may be used to make it easier to identify the location of a particular resonator during scribe tuning. Further, the scales along the side of the tuning forks 921A-930B can make it easier to cut the tuning forks in the proper location.

The cross couplings parts 915-917 and the tuning forks 921A-930B may be physically separated from main coupling stream that is carried out through center part along the direction from input 911 to output 912. Furthermore, the main couplings between the adjacent resonators (for example 901 to 902 or 902 to 903 etc. . . . ) are predominantly inductive, in contrast with the coupling via cross couplings 915-917 and the couplings to tuning forks 921A-930B, which are capacitive. The filter is designed to minimize interference between those three different kinds of couplings (the main couplings, the cross couplings and the tuning fork couplings). As described above with reference to the resonator 505, the "A" designated tuning forks 921A-930A may be used for fine tuning the resonators 901-910 and the "B" designated tuning forks 921B-930B may be used for course tuning the resonators 901-910. The tuning procedure for filter 900 will be described in detail below.

In one variation, the tuning process for filter 900 may be as follows. The filter 900 may be measured with a network analyzer (e.g., 235) and the data may be taken and saved in a memory (e.g., 215) of a computer (e.g., 205). The data may then be analyzed using a computer program via a controller/processor (e.g., 210). The computer program may proceed as follows. First, the electrical structure of the filter may be known, such as the number of resonators 901-910 and cross coupling structure 915-917, but a numbers of factors such as the resonant frequencies of resonators 901-910 and the couplings between the main portion of the resonators 901-910 may not be known. Once you know the numbers for the frequencies of resonators 901-910 and the couplings between the main portion of the resonators 901-910, you may then determine what's good and what's wrong on the filter 900 and you may be able to fix it. The computer program may then extract those numbers for you from measurement data. For example, for the B-band filter 900 having 10 resonators 901-910 and three cross coupling structures 915-917. In this example, mathematically, a 10-by-10 matrix and a couple of additional parameters may be used to represent the filter 900 and its environment. Those parameters may represent the filter's characteristics, such as resonant frequencies (diagonal elements 1105) and couplings (main couplings 1110, desired cross couplings 1120, and undesired parasitic couplings 1115). The additional parameters R1 and R10 describe the filter terminations, and thus its environment. By varying those parameters, the computer program may try to fit a computed characteristic curve into a measurement characteristic curve. If the fitting succeeded, the parameters determined by the computer program are the parameters of the measured filter 900. Once the filter's characteristics are extracted through this iterative process, the next step is the tuning. In one example, coupling values may be assumed to be constant and frequency may be tuned by using the tuning elements such as tuning forks 921A-930B. After the parameter extraction process, the matrix shown in FIG. 11 may be generated that contains all the information about the filter. Then, rather than changing (tuning) all the parameters in order to optimize filter response you only need to change the resonator frequencies, i.e. the diagonal elements of the matrix. This is possible because all the off diagonal elements are reasonably stable from run to run in fabrication due to accurate photolithography technology. The off-diagonal elements (coupling values) have already been established through a couple of re-design iterations before the final filter design is complete, so the couplings are typically well designed and reasonably stable, from one filter to another and across different processing and fabrication lots. However, the resonator frequencies usually show more variation in fabrication and may then need to be corrected (tuned). By varying the frequencies and keeping the couplings the same from the extracted coupling values, the return loss and/or insertion loss may be optimized by a computer program. The difference between extracted and optimized values in frequency may then be used to generate a recipe for tuning the filter 900, by for example scribing or trimming one or more tuning element(s). The filter tuning may be implemented by, for example, laser trimming or hand scribing based on the recipe.

Figure 20:
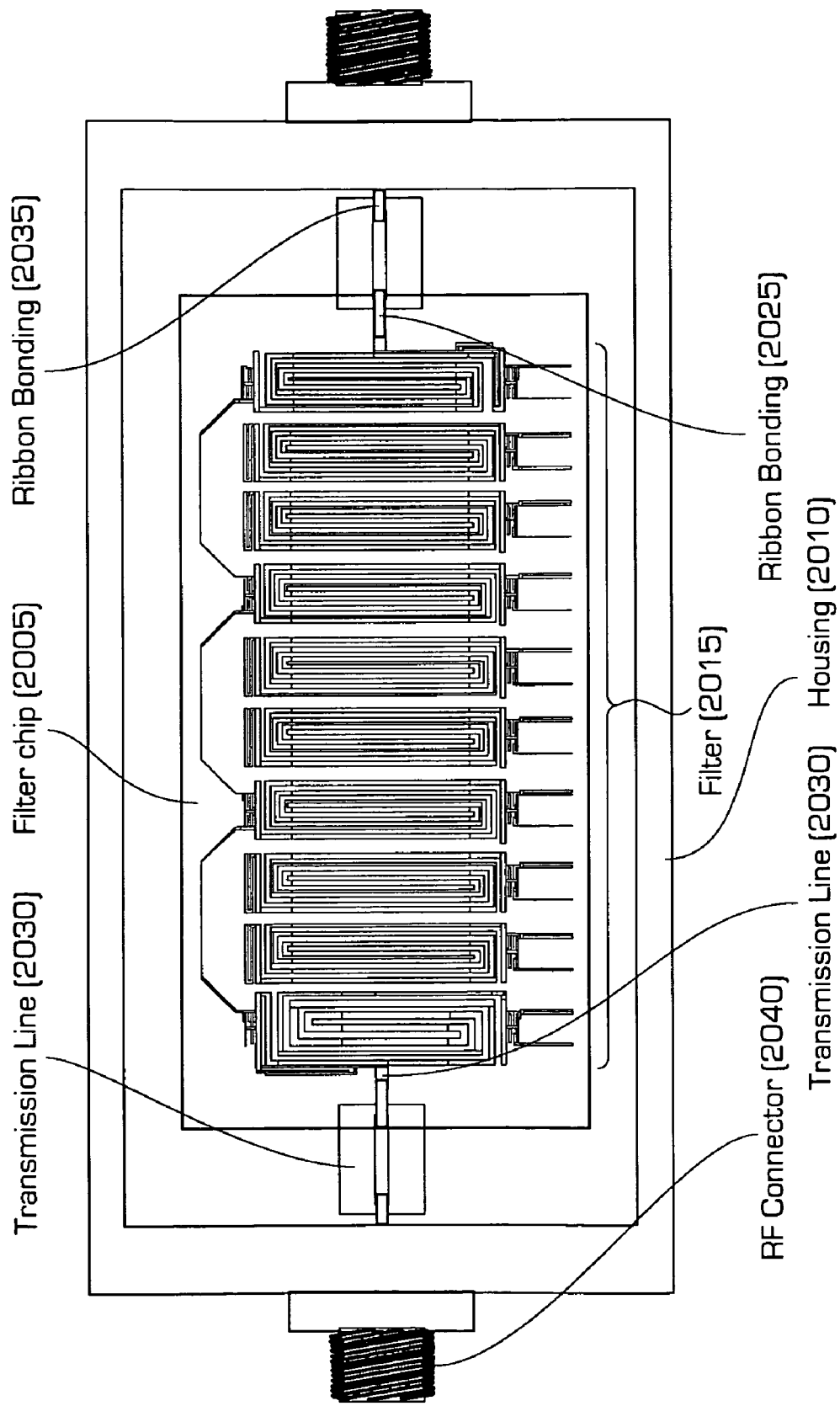
FIG. 20 is a diagram of a physical layout for a typical non-ideal filter test environment, according to at least one embodiment.

Now jumping ahead temporarily to FIGS. 20-22, a technique for taking into consideration in the tuning procedure a typical exemplary non-ideal filter test environment including the "dirty window(s)" will be described. FIG. 20 shows a physical layout of a typical exemplary non-ideal filter test environment. In this example, a filter chip 2005 is placed in a test housing or package 2010. In the case of an HTS device, the housing 2010 will allow the temperature of the filter chip 2005 to be cooled to an operating temperature, for example, 77K before measurements of the filter performance are taken. The filter chip 2005 housing 2010 may also be used as a real filter device. Filter chip 2005 includes a filter 2015 to be tested. The filter chip 2005 usually has 50 ohm transmission lines 2030 at both ends that extend the filter's 2015 input and output to the edges of the filter chip 2005. The electrical length of the transmission lines 2030 may vary depending on the filter 2015 design and its layout. The filter housing or package 2010 may also include additional transmission line chips 2030. RF connectors 2040 are attached at the sides of the filter housing or package 2010. Those RF connectors 2040 may be connected with a filter chip 2005 and/or transmission line chips 2030 by bonding ribbons or wires 2025 and 2035. Those bondings 2025 and 2035 will typically be transitions (or discontinuities) far from the desired ideal 50 ohm characteristic impedance. Often in real world situations, filters 2015 are measured, analyzed and deployed along with these types of unmatched circuits. In such situations, the matrix in FIG.

11 may not closely represent the real situation very well because of the existence of such "dirty windows" i.e. the non-ideal filter packaging and connection environment. In order to take this non-ideal packaging and connection environment into account in the filter tuning analysis, more parameters may be introduced in the analysis.

Figure 21:
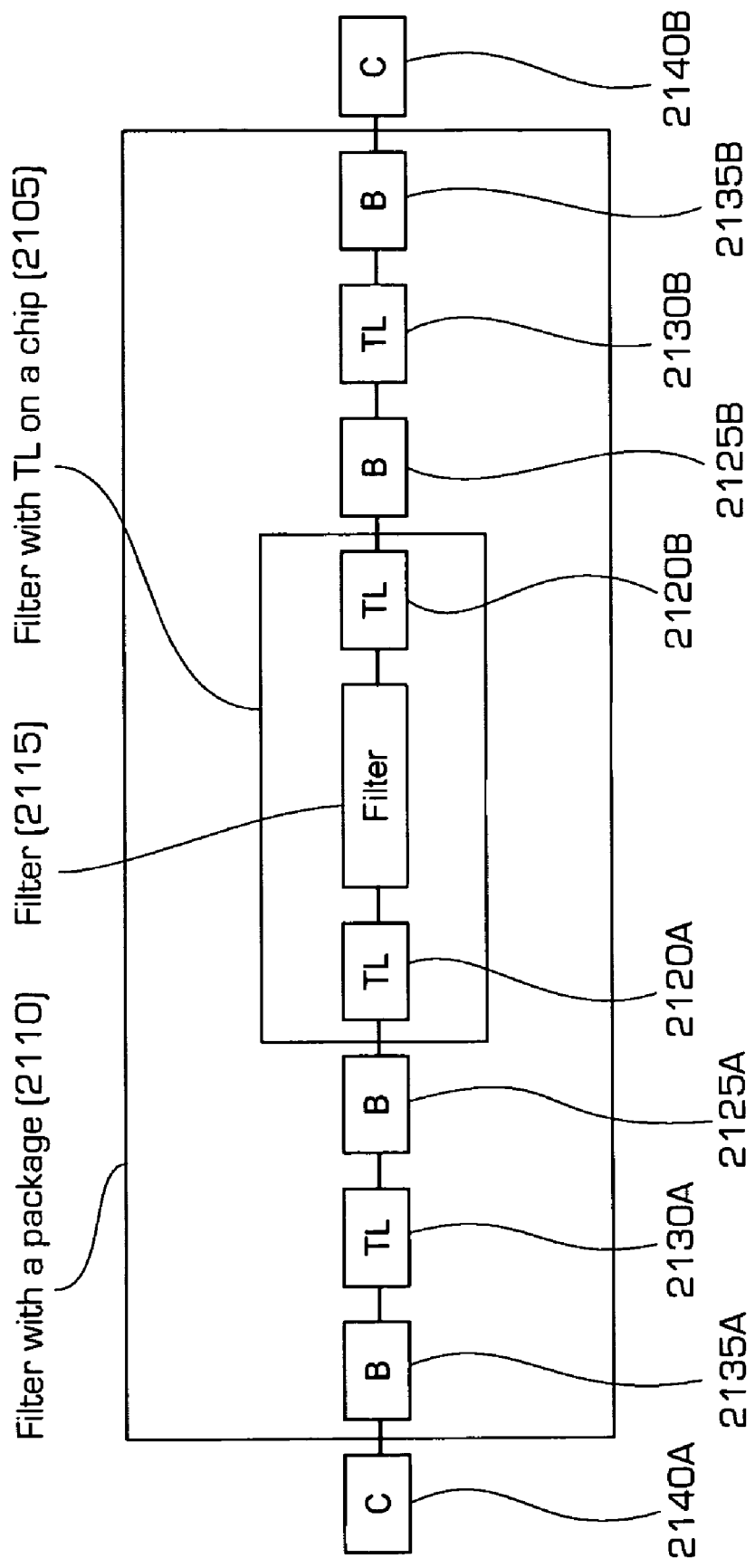
FIG. 21 is a block diagram of a equivalent circuit for the layout in FIG. 20, according to at least one embodiment.

As one exemplary way to represent the dirty window characteristics may be as illustrated in FIG. 21, as a simplified equivalent circuit. In this case, the filter chip 2105 is provided with a transmission line function 2120A to the left of a filter 2115 and connected thereto, and a transmission line function 2120B to the right of the filter 2115 and connected thereto, on a chip 2105. Further, using the same left-right orientation convention, bonding function 2125A is coupled to the transmission line function 2120A to the left and a bonding function 2125B is coupled to transmission line function 2120B to the right. Next, transmission line function 2130A is coupled to bonding function 2125A to the left and a transmission line function 2130B is coupled to bonding function 2125B to the right. Then, bonding function 2135A may be coupled to transmission line function 2130A to the left and bonding function 2135B may be coupled to transmission line function 2130B to the right. Finally, connector function 2140A may be coupled to bonding function 2135A to the left and connector function 2140b may be coupled to the bonding function 2135B to the right. Each of these function may be introduced into the tuning procedure as, for example, a constant, variable or linear or complex function. This additional factor consideration may help to improve the accuracy of filter tuning.

FIG. 22 is another exemplary simplified circuit representation of FIG. 21. By introducing $Z_{eff1}$, $\theta_1$ (DW 2205) and $Z_{eff2}$ and $\theta_2$ (DW 2215) as additional parameters, along with the coupling matrix elements and input and out couplings (1100), the analysis process will better reflect real filter devices more accurately and provide better tuning for the filter devices 2210, including their non-ideal packaging and connection environment. The filter tuning process will now be discussed more particularly with reference to tuning filter 900 by returning to the example shown in FIG. 9, as provided through experimentation.

First, filter 900 was fabricated as an HTS microwave filter fabricated using a YBCO thin film deposited and patterned on, for example, a 2-inch MgO wafer. Then filter 900 was put to a typical operating temperature, for example, 77K. A typical operating range for an HTS microwave filter may be, for example, in a range of approximately 60-100K.

Figure 10:
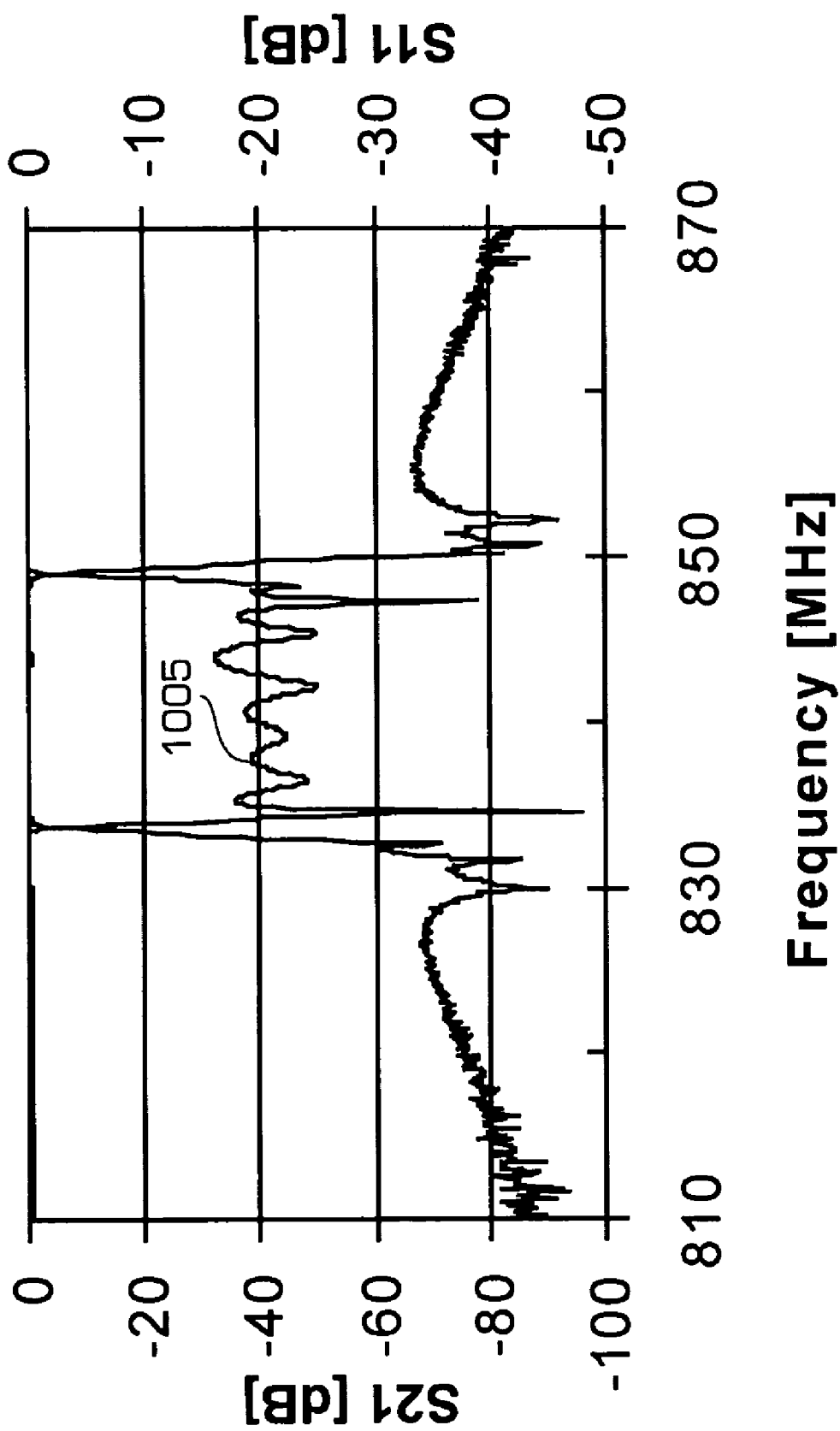
FIG. 10 is a graph of the initial measurement data before tuning for the filter shown in FIG. 9, according to at least one embodiment.

Referring now to FIG. 10, an initial measurement of filter 900 operating at 77K produced signal 1005. The return loss S11 at an initial measurement was about 17 dB and the measured initial filter center frequency was about 450 kHz lower than its target center frequency 842.37 MHz. Thus, it can be seen that in general the resonators 901-910 of the tested device needs to be tuned upward in frequency to achieve the desired pass band and improve return loss.

As noted previously, the tuning process may consist of three primary steps. The first step is diagnosis of the filter, which may include parameter extraction. In this example, the measurement data was analyzed by means of parameter extraction technique. Some exemplary parameter extraction techniques are shown in the articles S. Amari, "Synthesis of cross-coupled resonator filters using an analytical gradient-based optimization technique," *IEEE Trans. Microwave Theory & Tech.*, vol. 48, no. 9, pp. 1559-1564, September 2000 and P. Harscher, R. Vahldieck and S. Amari, Automated filter tuning using generalized low-pass prototype networks and gradient-based parameter extraction, IEEE Trans. Microwave Theory & Tech., vol. 49, no. 12, pp. 2532-2538, December 2001, which are hereby incorporated by reference for all purposes. A wide variety of curve fitting and optimization techniques are known in the art and are generally applicable to our invention. For example, The MathWorks Inc. provides a wide array of such routines in their Optimization Toolbox for MATLAB. The specific optimization routines needed will generally depend on the specific filter design. From this information the computer program may generate a coupling matrix.

The extracted coupling matrix 1100 is shown in FIG. 11. The solid line boxes (1105) represent frequency off-set of the resonators, dashed line boxes (1115) represents main couplings between neighboring resonators and dashed and dotted line boxes (1120) represent desired cross couplings. Those are parameters intentionally designed. Small dotted line boxes (1110) represent parasitic couplings between next neighboring resonators that are not desired to exist (but are nevertheless present). The next-neighboring resonator parasitic couplings (1110) were taken account in the extraction shown. In this embodiment, further parasitic couplings can be ignored because of the particular filter design selected. However, it should be noted that contribution from those couplings will generally depend on each particular filter design and may need to be taken into consideration sometimes. For example, resonator topology, arrangement of the resonators, and cross coupling implementation may all impact parasitic coupling values. Further parasitic couplings may have to be included into the coupling matrix as non-zero elements for some cases depending on design. Those undesired parasitic coupling matrix elements will generally affect the intended cross coupling structure. These couplings may impact to filter response even though their values are much smaller than main or cross coupling values because they create short-cut paths that don't fit in the desired topology. It may be worth to point out that existence of parasitic couplings may make the parameter extraction process more difficult, especially when the coupling structure of the filter design is complicated (e.g. multiple cross coupling design) and the resonator Q-factor is high, such as for filters made with superconductor materials. The reason is that existence of parasitic coupling may increases the number of optimization parameters and also may produces many local minimum solutions for the optimization. It should also be noted that many filters are packaged in non-ideal microwave packaging and other discontinuities which affect the filter performance as seen through the packaging. For example, a microwave filter packaging may include one or more of the following elements that may affect the filter performance including: microwave discontinuities, transmission lines, microwave cables, bond wires, stripline to microstrip transitions, cryocables, multiplexers, switches, limiters, low noise amplifiers, matching networks, directional couplers, splitters, microwave connectors.

The second step of the tuning process is filter response optimization which may include the adjustment of return loss S11. In this case, return loss S11 was optimized in a computer by adjusting resonant frequencies while keeping the couplings the same with the values that were obtained for the filter 900 during the diagnosis step. Since the real coupling values of the filter 900 may vary slightly from the ideal design coupling values, and parasitic couplings are present, the resonant frequencies may need to be intentionally mistuned from their design in order to compensate for these undesired coupling variations and achieve an equalized return loss S. In practice, filter tuner technicians know this and may intentionally mistune filters to some extent even though they may not know quantitatively by how much.

Figure 12:
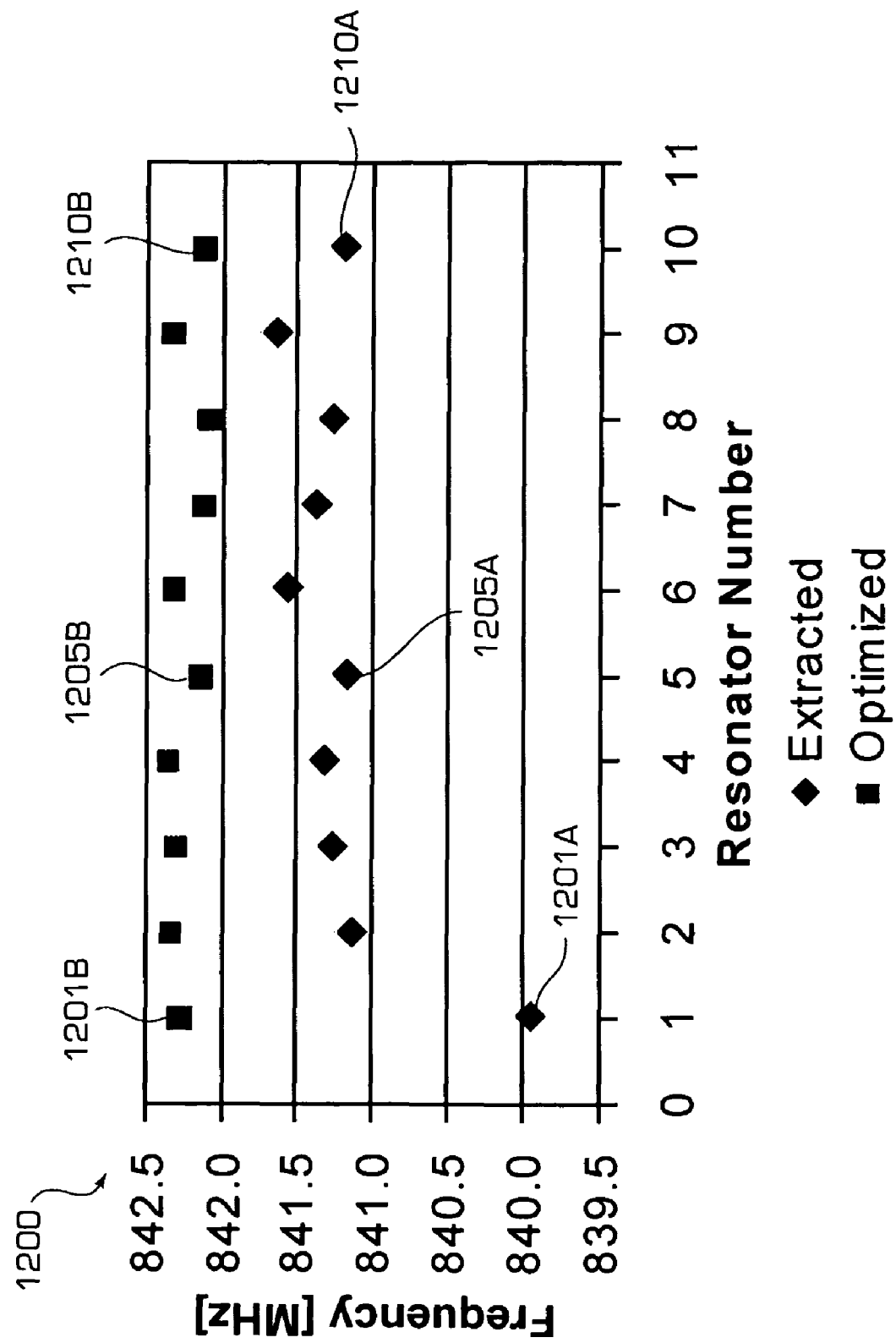
FIG. 12 is a graph of the extracted and optimized frequencies for each of the resonators in the filter shown in FIG. 9, according to at least one embodiment.

Referring now to FIG. 12, a graph 1200 of the resulting extracted frequencies and optimized frequencies for each of the resonators 901-910 of the filter shown in FIG. 9 are illustrated. A few exemplary frequency differences are as follows. The extracted frequency 1201A of resonator 901 is determined to be just less than 840 MHz while the optimized frequency 1201B for resonator 901 is determined to be approximately 842.25 MHz. The extracted frequency 1205A of resonator 905 is determined to be approximately 841.2 MHz while the optimized frequency 1205B for resonator 905 is determined to be approximately 842.2 MHz. The extracted frequency 1210A of resonator 905 is determined to be approximately 841.2 MHz while the optimized frequency 1210B for resonator 905 is determined to be approximately 842.2 MHz. The difference between the extracted frequency in the first step and the optimized one in the second step may be translated into a recipe for the physical tuning in the third step.

Figure 13:
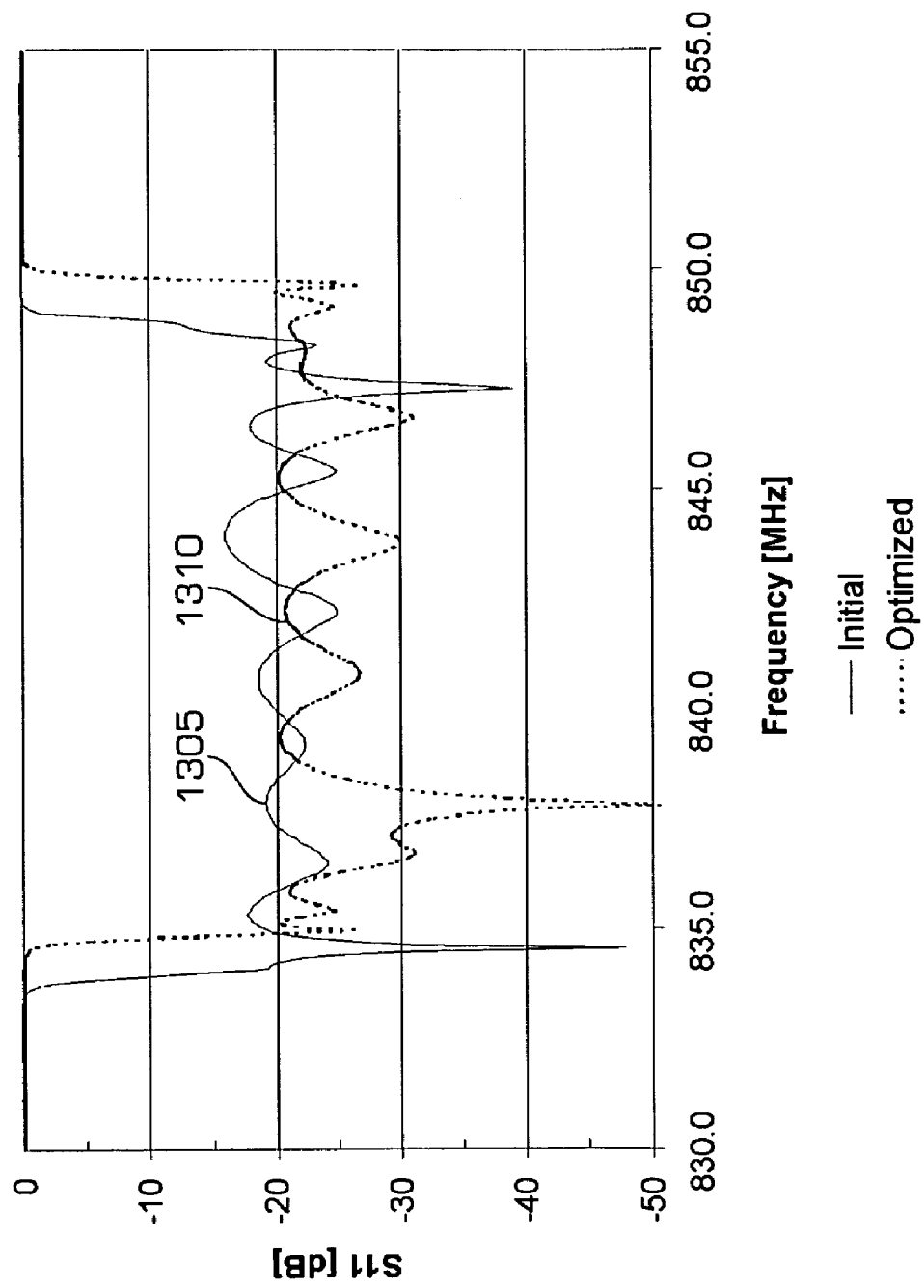
FIG. 13 is a graph of the initial measured and optimized return loss for the filter shown in FIG. 9, according to at least one embodiment.

FIG. 13 is a graph of the initial measured return loss 1305 and the optimized return loss 1310 for the filter 900 shown in FIG. 9. In this case, the computer may generate the optimized return loss signal 1310 from the previously performed analysis including the optimized frequencies developed for each of the resonators 901-910. The optimized return loss signal 1310 is approximately accurate to produce the expected of desired return loss at the targeted center frequency of the filter 900 pass band.

FIG. 14 is a table illustrating the recipe 1400 to be used for tuning resonators 1-10 (901-910) for filter 900 shown in FIG. 9 to produce the targeted filter response. A row of resonator numbers 1405 and a row of corresponding frequency deltas 1410 are provided. For example, by shifting resonant frequencies from a low delta of approximately 673 kHz for resonator 9 (909) and a high delta of approximately 2322 kHz for resonator 1 (901), the filter 900 will be expected to achieve 20 dB return loss at the target center frequency. As can be seen from FIGS. 12 and 14, the difference between the extracted and optimized frequencies is correlated to the amount of frequency shifting required to each resonator 901-910. This information may be generated by the computer and provided to a tuning technician as a recipe for purposes of tuning the filter 900. The tuning recipe 1400 may be, for example, displayed on a screen or printed on paper.

Figure 15:
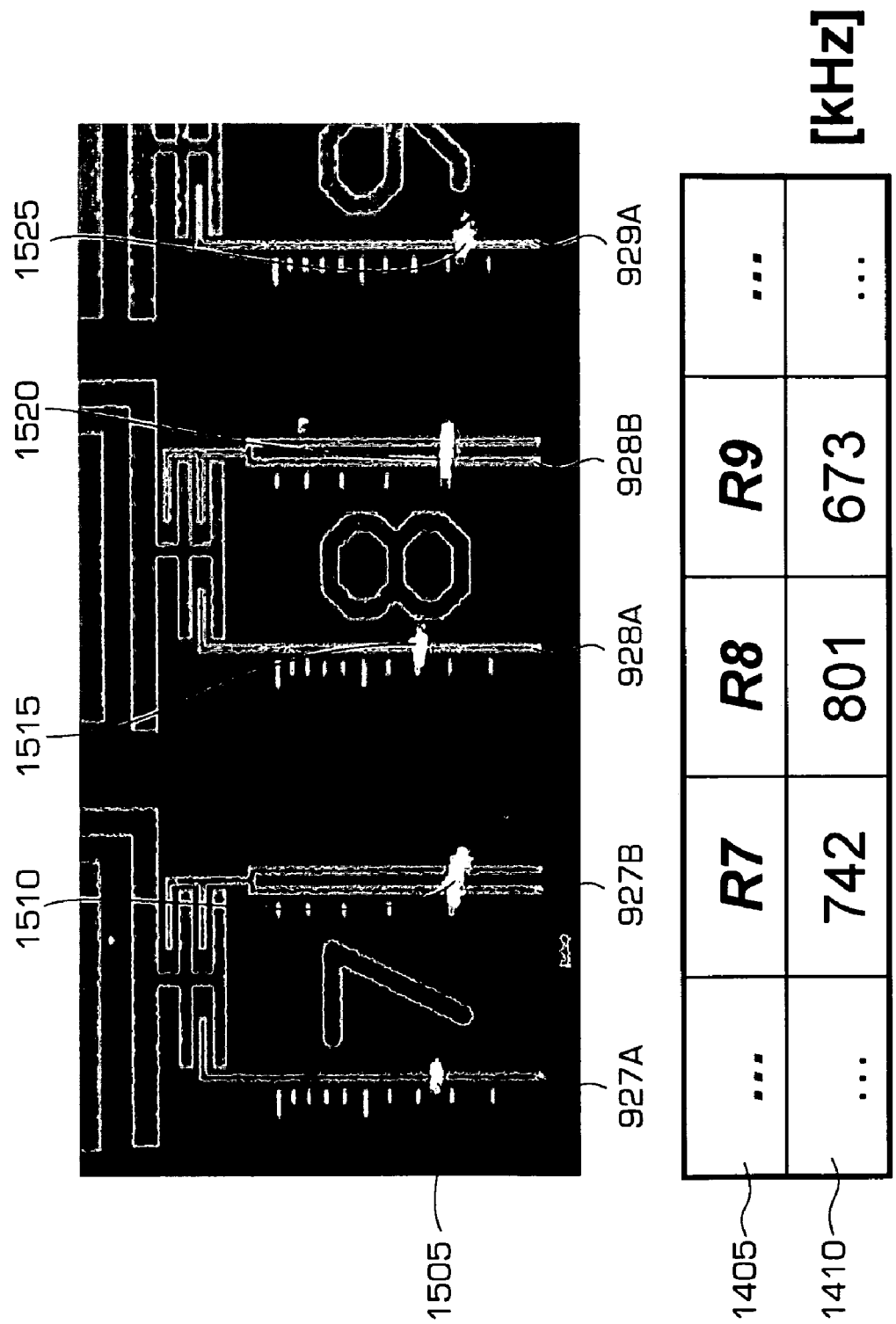
FIG. 15 is a diagram showing actual scribe lines on the tuning forks of resonators 7, 8 and 9, and the related portion of the recipe table for the filter shown in FIG. 9, according to at least one embodiment.

The filter 900 was then tuned based on the recipe 1400 by hand scribing with a diamond pen under a microscope. Although, as noted above, other methods such as laser scribing may be used and the laser scribing may be automated. FIG. 15 shows a portion of the tuning forks as they were scribed using a diamond pen according to the tuning recipe 1400. As illustrated, the tuning forks for resonator 7 (907) was tuned by scribing tuning fork 927A at point 1505 between the eighth and ninth scale hash marks and by scribing tuning fork 927B at the fifth scale hash mark. According to the recipe, the seventh resonator R7 needs 742 kHz shift for the tuning. The tuning fork 927A is design to give 100 kHz shift by one scale increment and 927B is designed to give 500 kHz shift by one scale increment. In order to achieve the required shift, 742 kHz, one scale portion of the tuning fork 927B is scribed 1510 for 500 kHz and the location between second scale and the third scale is scribed 1505 for another 250 kHz. Since this filter requires 100 kHz resolution for tuning on each resonator in order to meet its specification, so the design of tuning fork 927A enables scribing between the scales and gives good enough accuracy for the tuning +/−50 kHz. Further, the tuning forks for resonator 8 (908) was tuned by scribing tuning fork 928A at point 1515 at the seventh scale hash mark and by scribing tuning fork 928B at the fifth scale hash mark. As with the seventh resonator, one scale portion of the tuning fork 928B associate with the eighth resonator is scribed 1520 for 500 kHz and three scales portion of the tuning fork 928A are scribed 1515 for another 300 kHz.

Figure 16:
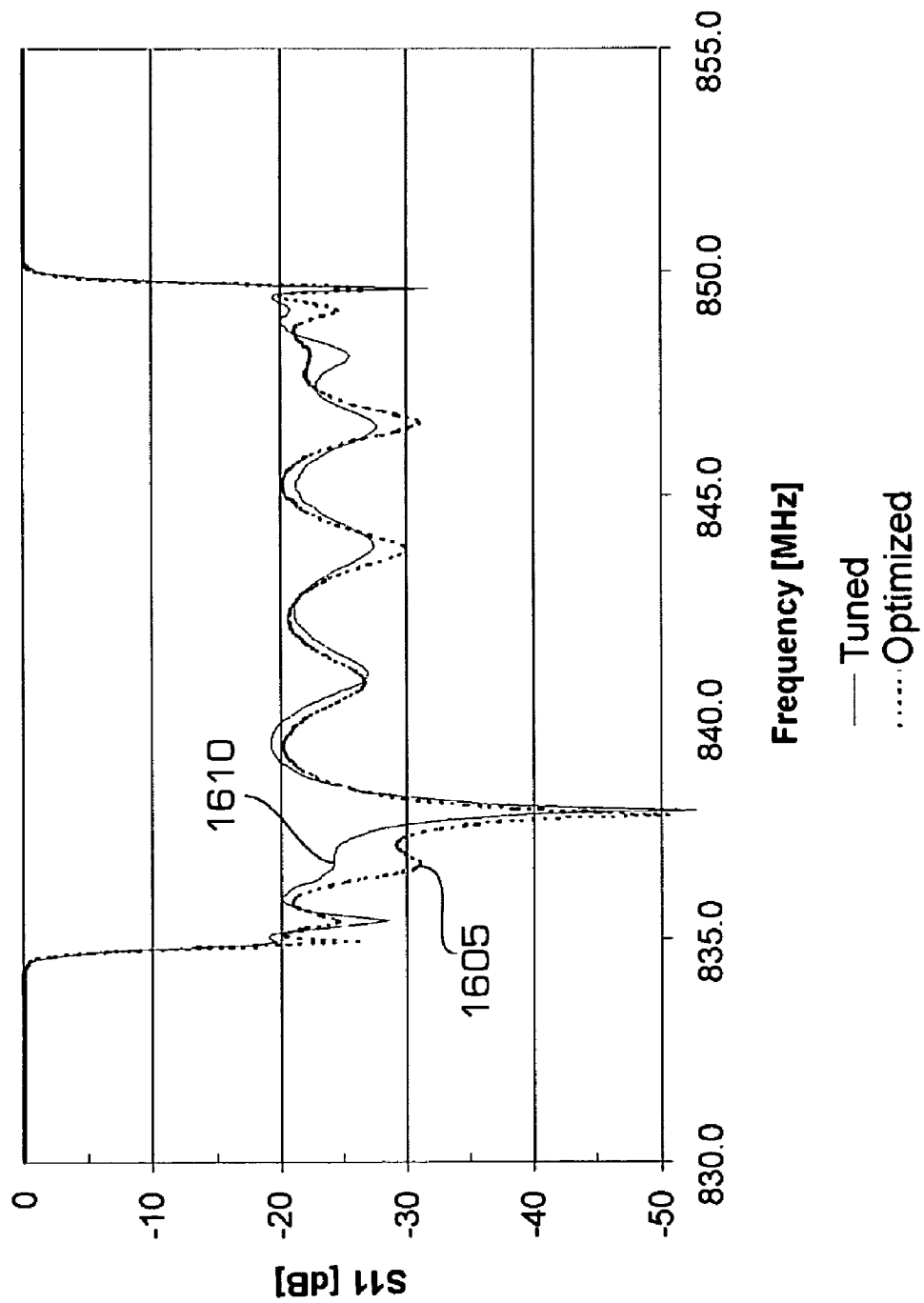
FIG. 16 is a graph of tuned and optimized return loss for the filter shown in FIG. 9, according to at least one embodiment.
Figure 17:
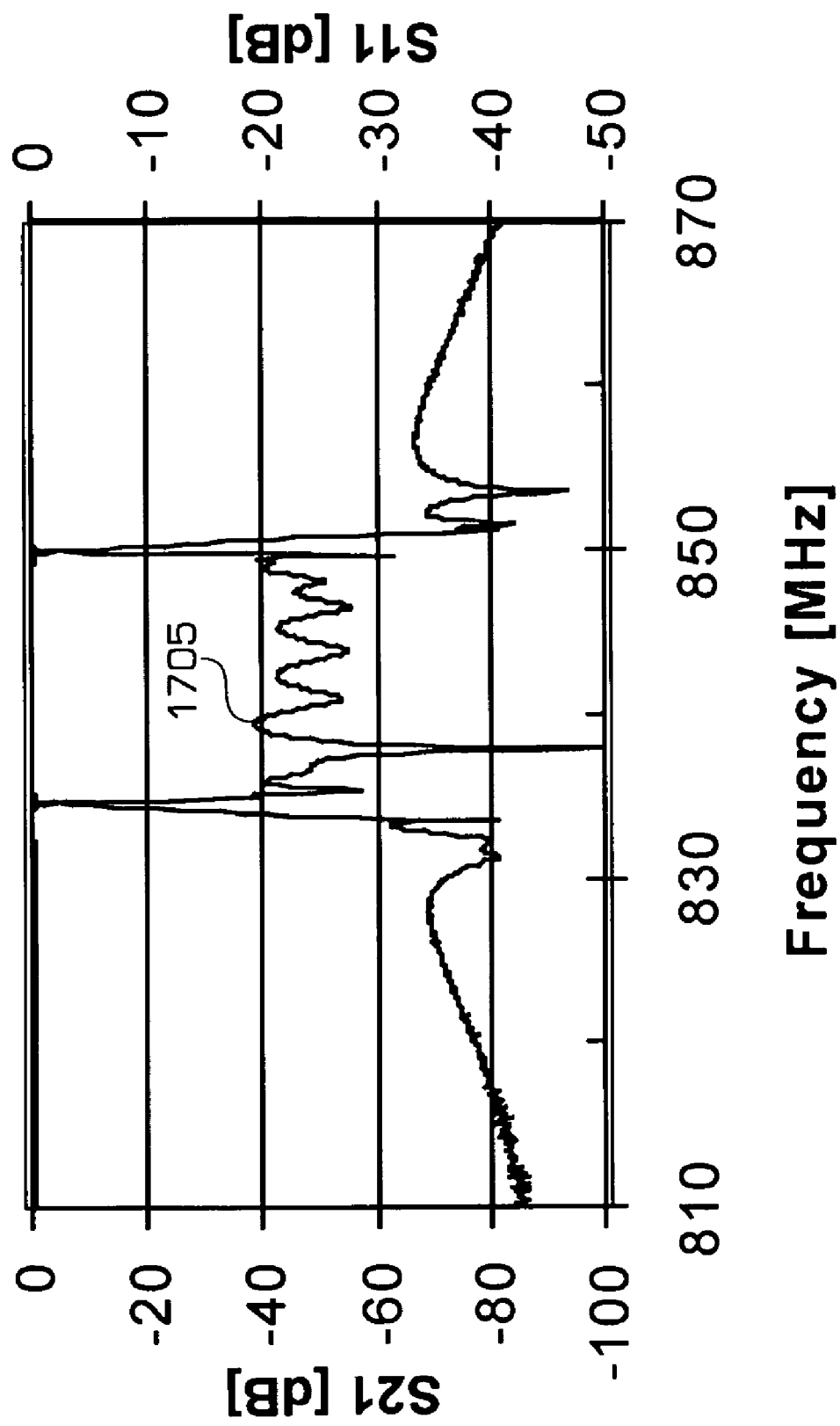
FIG. 17 is a graph of the measurement data after tuning of the filter shown in FIG. 9, according to at least one embodiment.

FIG. 16 shows the tuned response 1610 and the optimized 1605 prediction, after the filter 900 has been scribed according to the tuning recipe 1400. The filter is placed again at operating temperature, e.g., 77K, and the filter performance is measure. In this case it is shown in FIG. 16 that the band pass filter 900 actual return loss S performance after tuning 1610 agrees very well with the optimized return loss S 1605 and thus the desired filter performance. This can also be seen in FIG. 17, which shows the filter performance signal 1705 after tuning.

Figure 18:
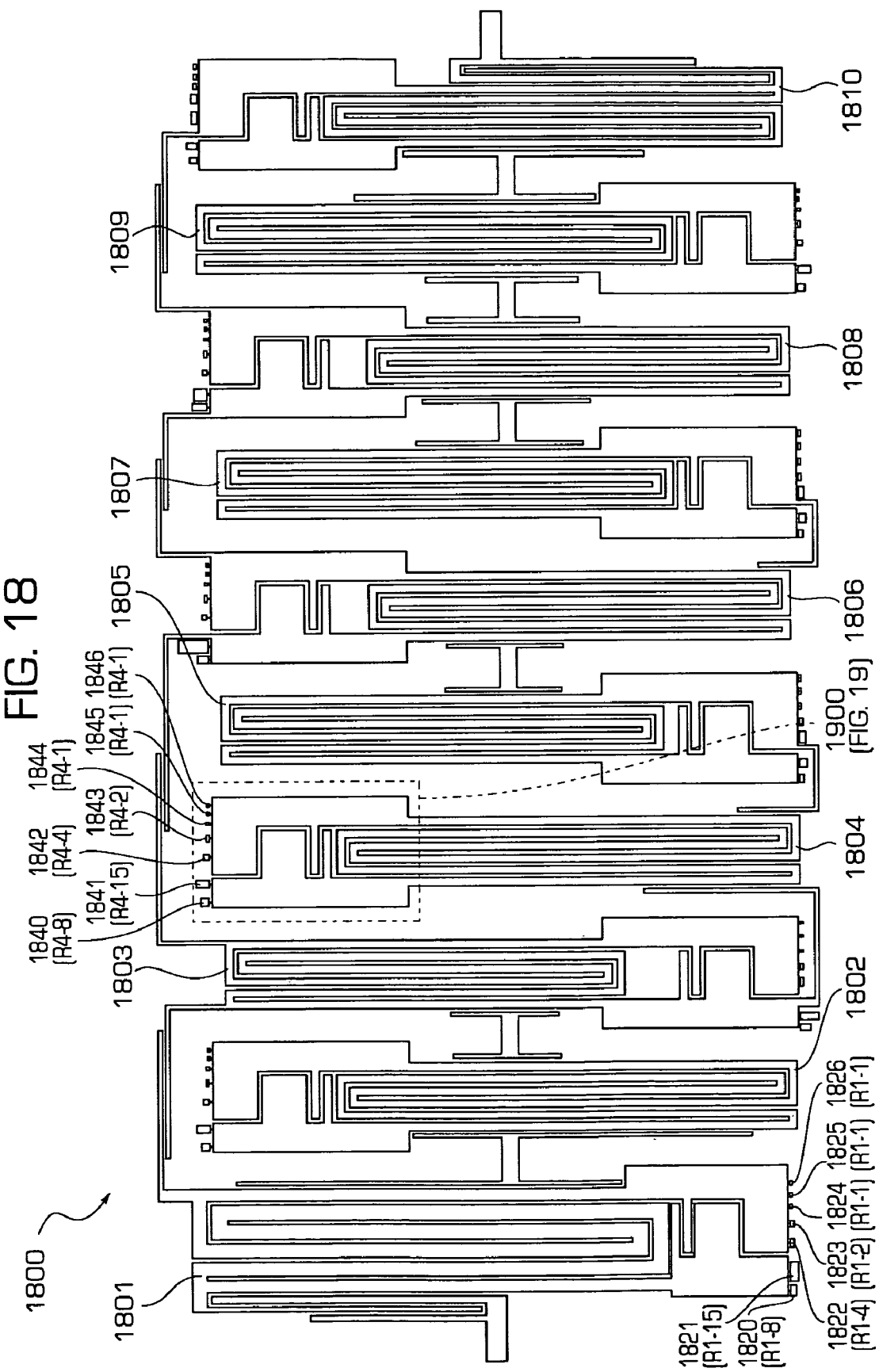
FIG. 18 is a top view layout of a multi-resonator planar filter device with trimming tab tuning elements according to at least one embodiment.
Figure 19:
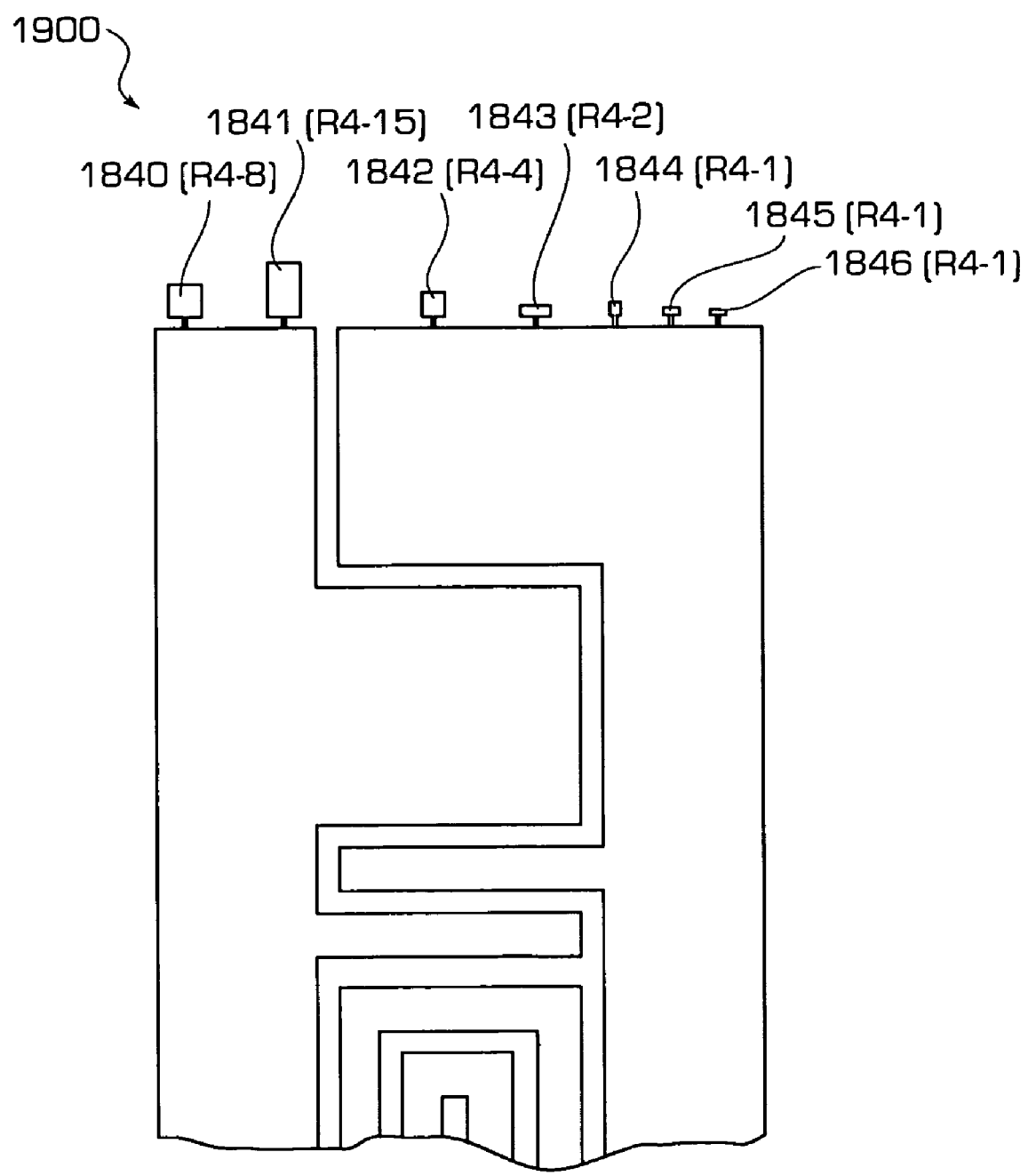
FIG. 19 is a portion of the top view layout of a multi-resonator planar filter device shown in FIG. 18, enlarged to better show the trimming tab tuning elements, according to at least one embodiment.

Another embodiment of the present invention is shown in FIGS. 18 and 19. In this embodiment the tuning element may include trimming one of more tabs. FIG. 18 is a top view layout of a multi-resonator planar filter device 1800 with trimming tab tuning elements. In this example, ten resonators 1801 through 1810 (1801-1810) are provided in series on a substrate, similar to previous embodiments. However, in this embodiment the tuning elements may be one or more trimming tabs, e.g., 1820-1826 and 1840-1846. These trimming tabs may be trimmed by severing the tab from the resonator, according to a tuning recipe that is generated in a manner similar to that for the previous embodiments. For ease of understanding, FIG. 19 provides an expanded view 1900 of the trimming tabs 1840-1846 that are shown in the dashed line area 1900 of FIG. 18.

For example, as output of the computer analysis after the optimization process, needed frequency shift for each resonator 1801-1810 may be calculated. Depending on pre-investigated sensitivity of a filter that is going to be tuned (e.g., the required frequency shift is digitized). Since this example filter may need, for example, 100 kHz precision in order to meet its specified operating characteristics, frequency off-set may be digitized in 100 kHz steps. For example, trimming tabs 1840-1846 may be designed in binary increment of 100 kHz frequency as a minimum shift. Similar to the tuning fork design, this design may provide for easy identification of the correct tuning devices to be trimmed. This example is provided with a filter 1800 having seven trimming tabs on each resonator 1801-1810 that can shift resonant frequency by, for example, 1500 kHz, 800 kHz, 400 kHz, 200 kHz and 100 kHz. There are three tabs those can shift 100 kHz. Thus, trimming tab 1840 is designated R4-8, indicating that it is associated with resonator 4 (1804) and resulting in an 800 kHz frequency shift to resonator 4 when trimmed. Trimming tab 1841 is designated R4-15, indicating that it is associated with resonator 4 (1804) and having an 1500 kHz frequency shift to resonator 4 when trimmed. Trimming tab 1842 is designated R4-4, indicating that it is associated with resonator 4 (1804) and having an 400 kHz frequency shift to resonator 4 when trimmed. Trimming tab 1843 is designated R4-2, indicating that it is associated with resonator 4 (1804) and having an 200 kHz frequency shift to resonator 4 when trimmed. Trimming tab 1844 is designated R4-1, indicating that it is associated with resonator 4 (1804) and having an 100 kHz frequency shift to resonator 4 when trimmed. Trimming tab 1845 is designated R4-1, indicating that it is associated with resonator 4 (1804) and having an 100 kHz frequency shift to resonator 4 when trimmed. Trimming tab 1846 is designated R4-1, indicating that it is associated with resonator 4 (1804) and having an 100 kHz frequency shift to resonator 4 when trimmed. Thus, using this example, if a resonator such as R4 1804 needs a 670 kHz frequency shift according to a tuning recipe, then, for example, a 400 kHz tab, a 200 kHz tab and a 100 kHz tab may be trimmed, disconnected, or removed by laser trimming. The process for determining the tuning recipe for this embodiment may be the same or similar to one or more of the processes previously described for the tuning fork embodiments previously described.

Simply rounding the optimized offsets to the discrete tab values can result in an undesired, (though small) shift in center frequency and an associated degradation of the filter response. One way to circumvent this problem is to further optimize the discrete tab values. One way to do this is to allow the target frequency to vary from minus half a minimum tab step to plus half a minimum tab step, i.e. −50 to +50 kHz for a minimum tab step of 100 kHz. In this way there will be a finite family of discrete tuning states that will each be a set of the tabs to be trimmed. The set of tabs to be trimmed can then be chosen from this set of tuning states by examining a number of characteristics of the tuning state. First, the average remaining offset between the discrete tuning state and the optimized frequency offsets can be attempted to be minimized, as this will contribute to the ultimate frequency offset. Second, one can also attempt to minimize the sum of squares of these remainders to determine the discrete tuning state that best represents the optimized frequency offsets. Third, one can examine the filter performance (e.g. return loss S11) for the family of discrete tuning states and select the tuning state which yields the closest to the desired performance. Fourth one can examine the stability of a given tuning state, by examining the frequency width over which it describes the optimized frequency offsets, as this will tend to give a more robust solution.

While embodiments of the invention have been described above, it is evident that many alternatives, modifications and variations will be apparent to those skilled in the art. For example, other methods of removal of material could be considered beyond laser or diamond pen scribing for either tuning fork or trimming tab type tuning elements, including but not limited to standard wet or dry photolithographic techniques, or focused ion beams (FIB). In another variation of the invention, the tuning element may be an electronically variable capacitor such as a semiconductor varactor, switched capacitor bank or MEMS capacitor. Any of the methods described for resonator tuning that are described in U.S. Pat. No. 6,898,450 "High Temperature Superconducting Tunable Filter", U.S. Pat. No. 6,727,702 "Tunable Superconducting Resonator and Methods of Tuning Thereof" and U.S. patent application Ser. No. 10/162,531 "Varactor Tuning for a Narrow Band Filter" could be used in conjunction with this invention and these references are incorporated herein for all purposes. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents.

We claim:

1. A method, comprising:
providing a filter including at least one resonator(s) and at least one tuning element(s), said filter having one or more filter design parameters selected from a group that includes resonator frequencies and resonator to resonator coupling values;
measuring a response of said filter so as to generate a set of measured data including at least a first set of measured data and a second set of measured data;
analyzing the set of measured data to extract one or more filter design parameter(s) to optimize, and the analyzing is done utilizing additional parameters representing a non-ideal filter environment, the first set of measured data and the second set of measured data;
optimizing a selected subset of filter design parameters to achieve a desired filter response;
generating a tuning recipe for an operator or automated tuning system to use in tuning the filter;
tuning the filter by altering the at least one tuning elements as established by the tuning recipe so as to correspond to said subset of filter design parameters; and
packaging the filter for use without confirming performance.

2. The method of claim 1, wherein the filter is planar, the at least one tuning element(s) is a separate structure from a structure of the at least one resonator(s), and both the structure of the at least one tuning element(s) and the structure of the at least one resonator(s) are formed on the same substrate.

3. The method of claim 1, wherein testing for and generating the tuning recipe occurs only once and the tuning recipe is used for making a plurality of adjustments to the at least one tuning element(s).

4. The method of claim 3, wherein the filter is made of a superconducting material or a high temperature superconductor (HTS).

5. The method of claim 1, wherein the filter response measurement is carried out at a standard operating temperature of the filter and the tuning of the at least one tuning element(s) is carried out at a temperature that is not an expected operating temperature of the filter.

6. The method of claim 1, wherein the set of measured data consists of more than one measurement of the filter response of the filter and the filter has been subjected to a known modification by altering one or more of the at least one tuning element(s) before at least one of the more than one measurement.

7. The method of claim 6, wherein the known modification is adjusting the resonant frequency of at least one resonator at an ambient temperature.

8. The method of claim 1, wherein the filter has more than four resonators and includes cross coupling elements between non-adjacent resonators.

9. The method of claim 1, wherein tuning is realized by removal of material at a temperature that is not an expected operating temperature so as to modify a capacitance or inductance in the filter by a known amount as indicated by the tuning recipe.

10. The method of claim 1, wherein tuning is realized by removal of material is achieved by means of a laser, diamond scribe, focused ion beams or photolithography performed at a temperature that is not an expected operating temperature of the filter.

11. The method of claim 1, wherein the at least one tuning element(s) is formed on the same substrate as the filter and includes one or more tabs which can be removed to reduce a shunt capacitance in the circuit.

12. The method of claim 1, wherein the at least one tuning element(s) is formed on the same substrate as the filter and consists of an array of tabs whose size and position are set so as to provide a binary array of shunt capacitive elements of varying sizes defining a tuning range and a minimum tuning resolution.

13. The method of claim 1, wherein the at least one tuning element(s) includes one or more tuning forks which are capacitively coupled to the filter.

14. The method of claim 1, wherein the at least one tuning element(s) include predefined gauged locations for altering the at least one tuning element(s).

15. The method of claim 1, wherein the optimized parameters are further optimized to account for a minimum realizable parameter change achievable with the at least one tuning element(s).

16. A filter tuning apparatus, comprising:
- a detuned multi cross-coupled resonator filter comprising more than four resonators including cross coupling elements between non-adjacent resonators, each resonator having at least one tuning element;
- a filter response measurement device;
- a first set of measured data;
- a means of adjusting the tuning element so as to achieve a change in one or more known filter design parameter(s) of the filter;
- a second set of measured data obtained after the tuning element has changed one of the one or more known filter design parameter(s);
- a means of extracting filter design parameters utilizing additional parameters representing a non-ideal filter environment, the first set of measured data and the second set of measured data in view of a change in one or more known design parameter(s);
- a means for directing the means of adjusting the tuning elements so as to achieve a desired filter performance based on extracted filter design parameters, and wherein the at least one resonator and the corresponding at least one tuning element are separate structures such that the corresponding at least one tuning element is designed specifically and uniquely to help tune the filter more easily, and not part of the resonator structure; and
- non-ideal filter packaging and other discontinuities which affect the filter performance as seen through the non-ideal packaging and other discontinuities.

17. The filter tuning apparatus of claim 16, wherein the directing includes a tuning recipe used in adjusting the at least one tuning element.

18. The filter tuning apparatus of claim 16, wherein the tuning elements include predefined gauged locations for altering the at least one tuning elements.

* * * * *

UNITED STATES PATENT AND TRADEMARK OFFICE
CERTIFICATE OF CORRECTION

| | |
|---|---|
| PATENT NO. | : 7,825,743 B2 |
| APPLICATION NO. | : 12/330510 |
| DATED | : November 2, 2010 |
| INVENTOR(S) | : Tsuzuki et al. |

It is certified that error appears in the above-identified patent and that said Letters Patent is hereby corrected as shown below:

Title page, left column, item (65) under the header PRIOR PUBLICATION DATA insert new header --RELATED U.S. APPLICATION DATA-- and --Continuation of Patent application serial No. 11/289,463, filed on November 30, 2005. Provisional application No. 60/632,084 filed on November 30, 2004.-- after "US 2009/00121802 A1 May 14, 2009"

Signed and Sealed this
Thirty-first Day of July, 2012

David J. Kappos
*Director of the United States Patent and Trademark Office*